United States Patent
Aihara

(12) 
(10) Patent No.: US 10,814,514 B2
(45) Date of Patent: Oct. 27, 2020

(54) METHOD OF MANUFACTURING AN ARTICLE OF APPAREL HAVING DYNAMIC VENT-SLITS

(71) Applicant: NIKE, INC., Beaverton, OR (US)

(72) Inventor: Yuki Aihara, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/719,883

(22) Filed: May 22, 2015

(65) Prior Publication Data

US 2016/0339594 A1 Nov. 24, 2016

(51) Int. Cl.
*B26D 3/12* (2006.01)
*A41D 31/00* (2019.01)
*A41D 27/28* (2006.01)
*A41D 31/14* (2019.01)

(52) U.S. Cl.
CPC ............. *B26D 3/12* (2013.01); *A41D 27/285* (2013.01); *A41D 31/00* (2013.01); *A41D 31/14* (2019.02)

(58) Field of Classification Search
CPC ................ A41D 2400/20; A41D 27/28; A41D 13/0025; A41D 31/125; A41D 31/14; A41D 27/285; A41D 31/00; B26D 3/12
See application file for complete search history.

(56) References Cited

U.S. PATENT DOCUMENTS

| | | |
|---|---|---|
| 1,571,016 A | 1/1926 | Lesser et al. |
| D72,293 S * | 3/1927 | McClain .................... D5/57 |
| 2,021,598 A | 11/1935 | Gastrich et al. |
| 2,033,065 A | 3/1936 | Galligan |
| 2,079,980 A | 5/1937 | Rudolph |
| 2,084,173 A | 6/1937 | Wexler et al. |
| 2,259,560 A | 10/1941 | Glidden |

(Continued)

FOREIGN PATENT DOCUMENTS

| | | |
|---|---|---|
| CN | 202958837 U | 6/2013 |
| FR | 2891115 A1 | 3/2007 |

(Continued)

OTHER PUBLICATIONS

Cut Out & Keep, Make Your Own 'Hole Y' T Shirt!, avaiable on Apr. 18, 2017 at : https://www.cutoutandkeep.net/projects/make-your-own-hole-y-t-shirt.*

(Continued)

*Primary Examiner* — Jonathan G Riley
(74) *Attorney, Agent, or Firm* — Shook, Hardy & Bacon, L.L.P.

(57) ABSTRACT

A method of manufacturing an article of apparel having dynamic vent-slits includes providing a fabric having a first surface and a second surface, forming a plurality of slits in a repeating fashion on the fabric, wherein a spacing between two adjacent slits in linear alignment is less than a length of a slit in non-linear alignment with the two slits and that is offset from the two slits such that the slit in non-linear alignment overlies the spacing between the slits in linear alignment, and the slit in non-linear alignment is parallel to the slits in linear alignment. The method further includes forming the fabric into at least part of the article of apparel. The slits may be positioned in one or more groupings, or aligned in different directions to open in response to different directions of stretch or movement, to provide dynamic ventilation.

18 Claims, 13 Drawing Sheets

(56) References Cited

U.S. PATENT DOCUMENTS

| | | | |
|---|---|---|---|
| 2,428,127 A | 9/1947 | Sidnell | |
| 2,641,045 A | 6/1953 | Bondy et al. | |
| 2,659,085 A | 11/1953 | Ericson | |
| 2,771,661 A | 11/1956 | Foster | |
| 2,790,176 A | 4/1957 | Cunningham | |
| 2,820,224 A * | 1/1958 | Potteiger | A41D 27/10 2/113 |
| 2,897,506 A | 8/1959 | Carter et al. | |
| 3,086,215 A | 4/1963 | Di Paola | |
| 3,153,793 A | 10/1964 | Lepore et al. | |
| 3,253,598 A | 5/1966 | Spanel et al. | |
| 3,296,626 A | 1/1967 | Ludwikowski et al. | |
| 3,698,016 A | 10/1972 | Saddler | |
| 3,703,432 A | 11/1972 | Koski et al. | |
| 3,761,962 A * | 10/1973 | Myers | A41D 27/28 2/227 |
| 3,771,169 A | 11/1973 | Edmund | |
| 3,801,987 A | 4/1974 | Thompson | |
| 3,956,906 A | 5/1976 | Cassidy, Sr. et al. | |
| 4,185,327 A | 1/1980 | Markve et al. | |
| 4,408,356 A | 10/1983 | Abrams | |
| 4,619,004 A | 10/1986 | Won | |
| 4,791,685 A | 12/1988 | Maibauer | |
| 5,105,477 A | 4/1992 | Golde | |
| 5,105,478 A * | 4/1992 | Pyc | A41D 27/28 2/106 |
| 5,269,862 A | 12/1993 | Nakajima et al. | |
| 5,275,077 A * | 1/1994 | Kobayashi | B26D 3/085 83/30 |
| 5,446,927 A | 9/1995 | Weldon | |
| 5,642,526 A | 7/1997 | Thompson | |
| 5,659,895 A * | 8/1997 | Ford, Jr. | A62B 17/008 2/2.11 |
| 5,714,107 A | 2/1998 | Levy et al. | |
| 5,804,021 A * | 9/1998 | Abuto | B32B 5/26 156/229 |
| 5,873,868 A | 2/1999 | Nakahata | |
| 5,935,878 A | 8/1999 | Glasser | |
| 6,145,132 A | 11/2000 | Towner | |
| 6,279,161 B1 | 8/2001 | Johnston | |
| 6,299,505 B1 | 10/2001 | Huang | |
| 6,339,845 B1 | 1/2002 | Burns et al. | |
| D457,709 S * | 5/2002 | Davis | D2/717 |
| 6,398,620 B1 | 6/2002 | Huang | |
| 6,401,250 B1 * | 6/2002 | McNabb | A41D 1/06 2/227 |
| D480,536 S | 10/2003 | Codere | |
| 6,632,504 B1 | 10/2003 | Gillespie et al. | |
| 6,871,515 B1 | 3/2005 | Starbuck et al. | |
| 7,043,766 B1 | 5/2006 | Foreman et al. | |
| 7,214,120 B2 | 5/2007 | Kaye et al. | |
| 7,234,171 B2 | 6/2007 | Rowe et al. | |
| D563,629 S * | 3/2008 | Barbour | D2/840 |
| 7,437,774 B2 | 10/2008 | Baron et al. | |
| 7,540,037 B1 | 6/2009 | Bittler et al. | |
| 7,754,626 B2 | 7/2010 | Baron et al. | |
| 7,832,022 B1 | 11/2010 | Peters | |
| 8,048,371 B1 | 11/2011 | Kapur et al. | |
| 8,726,414 B2 | 5/2014 | Baron et al. | |
| 9,192,198 B2 | 11/2015 | Nordstrom et al. | |
| 9,198,469 B2 | 12/2015 | Clement et al. | |
| D746,543 S * | 1/2016 | McClain | D2/731 |
| 9,332,792 B2 | 5/2016 | Harber | |
| 10,045,570 B2 | 8/2018 | Hoeven | |
| 10,413,006 B2 | 9/2019 | Carter et al. | |
| 2003/0114782 A1 | 6/2003 | Chiang et al. | |
| 2004/0025217 A1 | 2/2004 | Mazzarolo | |
| 2004/0098784 A1* | 5/2004 | Desai | A41B 9/00 2/69 |
| 2005/0060792 A1 | 3/2005 | Desai | |
| 2005/0125872 A1 | 6/2005 | Hobbs | |
| 2005/0204449 A1 | 9/2005 | Baron et al. | |
| 2005/0208266 A1* | 9/2005 | Baron | A41D 27/28 428/131 |
| 2006/0201612 A1* | 9/2006 | Lin | B32B 38/04 156/229 |
| 2006/0223400 A1 | 10/2006 | Yasui et al. | |
| 2007/0028362 A1 | 2/2007 | Cash | |
| 2007/0161305 A1 | 7/2007 | Wangbunyen | |
| 2008/0078009 A1 | 4/2008 | Black et al. | |
| 2009/0178174 A1 | 7/2009 | Cash, Jr. | |
| 2010/0122403 A1* | 5/2010 | Mickle | A41D 13/0512 2/461 |
| 2010/0139665 A1 | 6/2010 | Cheng | |
| 2010/0242151 A1 | 9/2010 | Mather | |
| 2011/0083246 A1* | 4/2011 | Vitarana | A41D 13/0015 2/69 |
| 2011/0225698 A1* | 9/2011 | Haga | A41D 13/00 2/69 |
| 2012/0225257 A1* | 9/2012 | Noda | B29C 51/14 428/174 |
| 2012/0284894 A1* | 11/2012 | Brown | A41D 13/0015 2/69 |
| 2013/0239294 A1 | 9/2013 | Clement et al. | |
| 2013/0276201 A1* | 10/2013 | Pezzimenti | A41D 27/245 2/69 |
| 2014/0000004 A1* | 1/2014 | Baron | A41B 1/00 2/69 |
| 2014/0053312 A1 | 2/2014 | Nordstrom et al. | |
| 2014/0109286 A1 | 4/2014 | Blakely et al. | |
| 2014/0338091 A1 | 11/2014 | Kenney et al. | |
| 2017/0028669 A1 | 2/2017 | Regester et al. | |
| 2017/0071275 A1 | 3/2017 | Darby | |
| 2019/0061307 A1 | 2/2019 | Chen et al. | |

FOREIGN PATENT DOCUMENTS

| | | | |
|---|---|---|---|
| GB | 540545 A | 10/1941 | |
| GB | 697889 A | 9/1953 | |
| GB | 2312643 A1 | 11/1997 | |
| WO | 9853980 A1 | 12/1998 | |
| WO | WO 9853980 A1 * | 12/1998 | A41D 27/28 |
| WO | 03041525 A1 | 5/2003 | |

OTHER PUBLICATIONS

Radius of Curvature, Nanette South • Published on Jun. 18, 2009 • Engineering Blogs, available on Jan. 13, 2020 at https://www.monolithic.org/ (Year: 2009).*

Non-Final Office Action dated Oct. 21, 2016 in U.S. Appl. No. 14/719,888, 8 pages.

International Search Report and Written Opinion dated Jul. 20, 2016 for International Application No. PCT/US2016/030745, 13 pages.

International Search Report and Written Opinion dated Jul. 20, 2016 for International Application No. PCT/US2016/030748, 13 pages.

International Search Report and Written Opinion dated Jul. 20, 2016 for International Application No. PCT/US2016/030750, 12 pages.

Final Office Action dated May 25, 2017 in U.S. Appl. No. 14/719,888, 14 pages.

Non-Final Office Action dated Jul. 13, 2017 in U.S. Appl. No. 14/719,894, 20 pages.

Non-Final Office Action dated Oct. 3, 21017 in U.S. Appl. No. 14/719,888, 13 pages.

International Preliminary Report on Patentability dated Dec. 7, 2017 in International Patent Application No. PCT/US2016/030745, 8 pages.

International Preliminary Report on Patentability dated Dec. 7, 2017 in International Patent Application No. PCT/US2016/030748, 8 pages.

International Preliminary Report on Patentability dated Dec. 7, 2017 in International Patent Application No. PCT/US2016/030750, 8 pages.

Final Office Action dated Jan. 26, 2018 in U.S. Appl. No. 14/719,894, 25 pages.

Non-Final Office Action dated Oct. 3, 2018 in U.S. Appl. No. 14/719,894, 22 pages.

Communication pursuant to Article 94(3) dated May 27, 2019 in European Patent Application No. 16723881.5, 6 pages.

(56) References Cited

OTHER PUBLICATIONS

Communication pursuant to Article 94(3) dated May 27, 2019 in European Patent Application No. 16722496.3, 6 pages.
Communication pursuant to Article 94(3) dated May 27, 2019 in European Patent Application No. 16725001.8, 6 pages.
Final Office Action dated Apr. 10, 2019 in U.S. Appl. No. 14/719,894, 24 pages.
Final Office Action dated May 8, 2018 in U.S. Appl. No. 14/719,888, 15 pages.
Non-Final Office Action dated Nov. 26, 2019 in U.S. Appl. No. 15/907,889, 16 pages.
Goldsmith, John S., U.S. Pat. No. 0397543 issued Feb. 12, 1889, 3 pages.
Intention to Grant received for European Patent Application No. 16723881.5, dated Mar. 3, 2020, 6 pages.
Intention to Grant received for European Patent Application No. 16722496.3, dated Apr. 30, 2020, 7 pages.
Final Office Action received for U.S. Appl. No. 15/907,889, dated Mar. 12, 2020, 14 pages.

* cited by examiner

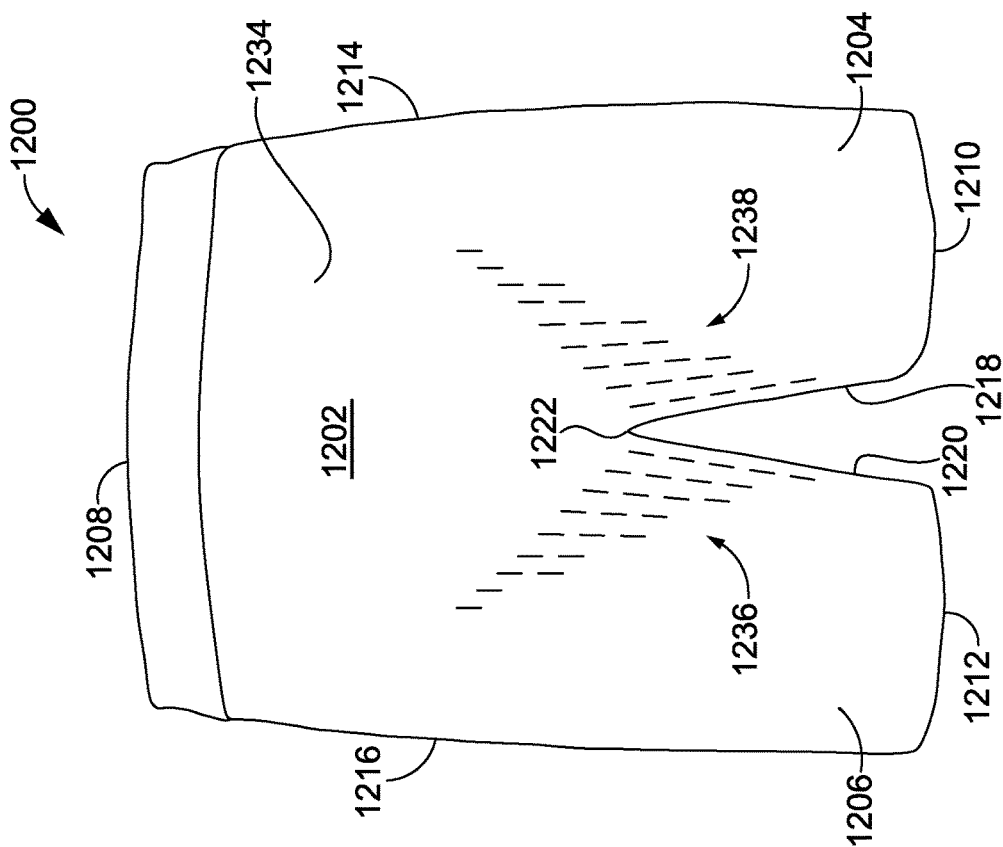
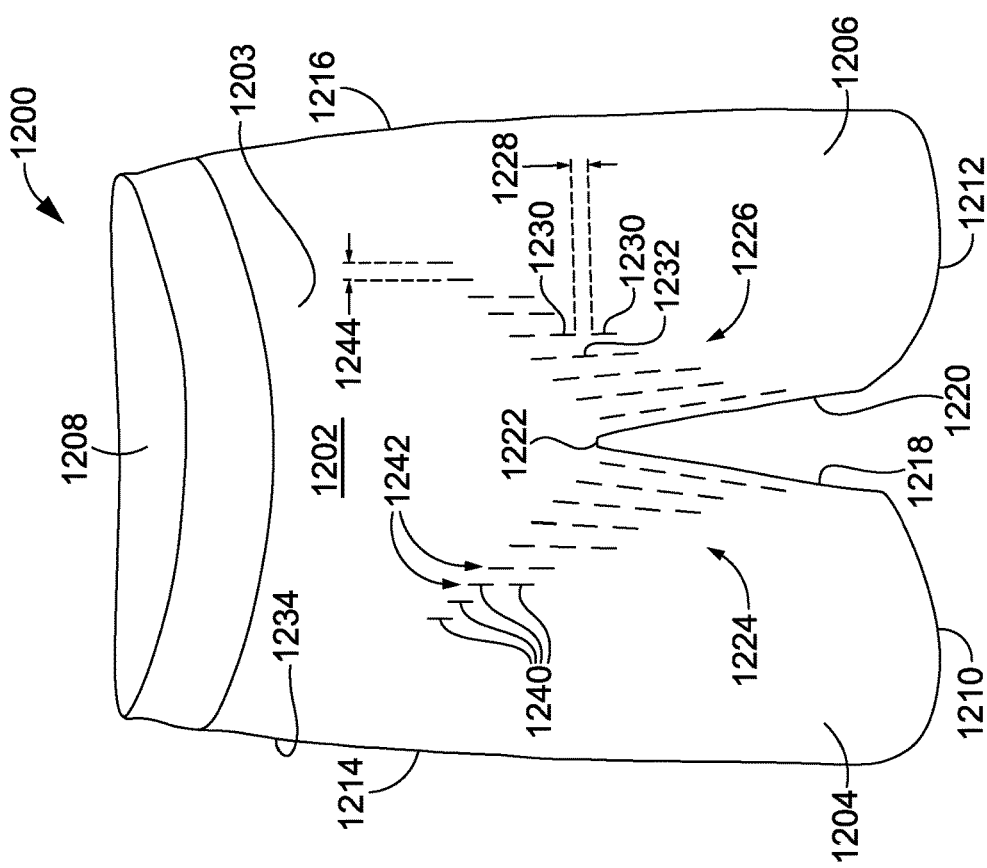

METHOD OF MANUFACTURING AN ARTICLE OF APPAREL HAVING DYNAMIC VENT-SLITS

CROSS-REFERENCE TO RELATED APPLICATIONS

This application is related by subject matter to commonly assigned and concurrently filed U.S. application Ser. No. 14/719,888 and U.S. application Ser. No. 14/719,894 which are incorporated herein by reference in their entirety.

TECHNICAL FIELD

The present disclosure relates to vent-slits. More specifically, the present disclosure relates to vent-slits incorporated into an article of apparel to provide dynamic ventilation for the article.

BACKGROUND

In certain circumstances, it is desirable to have an article of apparel with variable structural and performance characteristics. For example, certain apparel articles benefit from having dynamic permeability and/or adjustable ventilation. In particular, athletic apparel, commonly known as "active wear," requires breathability to maintain wearer comfort. In such apparel, poor ventilation, ventilation in improper areas of the article, and limited airflow results in a build-up of perspiration and humidity inside the article and adjacent to the wearer. Some articles of apparel feature vent structures to reduce these issues. These existing vent structures have numerous disadvantages, including, for example, inconsistent opening, puckering, and/or flattening of the structures when the article is stretched, as well as opening of the vent structures at the wrong time. As a result, a new dynamic vent-slit structure that opens uniformly and consistently, and that provides dynamic ventilation for a wearer in response to specific movements and directions of stretch, is needed.

BRIEF SUMMARY

This summary is provided to introduce a section of concepts in a simplified form that are further described below in the detailed description section of this disclosure. This summary is not intended to identify key features or essential features of the claimed subject matter, nor is it intended to be used as an aid in isolation for determining the scope of the claimed subject matter. The scope of the invention is defined by the claims.

In general, the vent-slits described herein provide dynamic and targeted ventilation for specific areas of an article of apparel. The vent-slits may be strategically placed in areas of the article that are exposed to the greatest amounts of heat, humidity, and perspiration, and may be configured, arranged, or integrated to provide motion activated venting. In this regard, the slits open in response to specific forces, directions of stretch, or movements by a wearer of the article, in order to improve ventilation of the article. Moreover, the vent-slits described herein provide a consistent and uniform opening to provide enhanced ventilation.

At a high level, aspects described herein relate to an article of apparel having dynamic vent-slits. The slits may be located on various parts of the article in one or more groupings, the slits in each grouping aligned in the same direction and arranged in a repeating pattern. The pattern may include two slits in linear alignment separated by a spacing, and a slit in non-linear alignment with the two slits, the slit in non-linear alignment being longer than the spacing between the two slits in linear alignment. The slit in non-linear alignment may be offset from the slits in linear alignment such that the slit in non-linear alignment overlies the spacing between the slits in linear alignment, the slit in non-linear alignment being parallel to the slits in linear alignment. As used throughout this disclosure, the term "overlies" or "overlays" in relation to the slits in a slit pattern shall mean that a slit in a non-linear and parallel alignment with two slits in linear alignment is positioned such that its long axis is spaced apart from and is in parallel with the space between the two slits in linear alignment. The term "overlies" or "overlays" shall not mean that the slit in non-linear alignment intersects with or crosses over the two slits in linear alignment.

This pattern provides an arrangement of slits that contains no linear path through the pattern perpendicular to the long-axis orientation of the slits. As a result, a stretch force applied perpendicular to the long axis of the slits travels in a zig-zag pattern through the article into which the slits are integrated. This helps to distribute the stretch force uniformly across the slit pattern as the stretch force travels across the article into which the slits are integrated, thus opening the slits evenly. This distribution of force is best accomplished when a spacing between the slits in linear alignment is shorter than the length of the slit positioned in non-linear alignment and overlying the spacing between the slits in linear alignment. This repeating pattern of slits may be positioned in different areas of the article, and may be formed to have varying angles, cross-sectional layouts, and orientations on the article to allow the slits to open in response to the article being stretched in different directions.

The vent-slits may be incorporated into various upper and lower body articles of apparel, including but not limited to jackets, shirts, pullovers, shorts, pants, capris, ¾ pants, and the like. Such apparel may be used for a variety of different athletic activities, including, but not limited to, running, basketball, athletic training, global football (soccer), tennis, golf, and the like. The slits may be arc shaped, half-circle shaped, or the like, such that in the open position, the slits provide directionality to the venting. The slits may also simply be straight or boxed.

In one aspect, a method of manufacturing an article of apparel is provided. The method comprises providing a fabric having a first surface and an opposite second surface, forming a plurality of slits in a repeating fashion on the fabric, wherein a spacing between two adjacent slits in linear alignment is less than a length of a slit in non-linear alignment with the two slits and that is offset from the two slits such that the slit in non-linear alignment overlies the spacing between the slits in linear alignment, and the slit in non-linear alignment is parallel to the slits in linear alignment, and forming the fabric into at least part of the article of apparel.

In another aspect, a method of manufacturing a vented article of apparel is provided. The method comprises providing a fabric having a first surface and an opposite second surface, cutting a plurality of slits oriented substantially parallel to each other through the first surface and the second surface of the fabric, wherein at least two of the plurality of slits are in linear alignment, and wherein a spacing between the at least two slits is less than a length of a slit positioned adjacent to the at least two slits and in non-linear alignment with respect to the at least two slits, and forming the fabric into at least part of the article of apparel, wherein the slits are positioned in two or more distinct groupings on the article of apparel, the slits within each grouping aligned in the same direction.

In another aspect, a method of manufacturing a modified article of apparel is provided. The method comprises providing a fabric having a first surface and an opposite second surface, integrating a plurality of slits into the fabric through the first surface and the second surface, the plurality of slits forming columns in parallel configuration, wherein a spacing between two slits in linear alignment in a first column is less than a length of a slit positioned in an adjacent second column, wherein the spacing between the two slits in the first column is aligned at least partially with the slit positioned in the adjacent second column, and forming the fabric into at least part of the article of apparel, wherein when the fabric is stretched in a direction perpendicular to a long-axis of the slits, the slits open to provide a direct path through the first and the second surfaces of the fabric to a body of the wearer.

Aspects described herein may feature different configurations, arrangements, and/or alignments of the slits, and are not limited to the examples provided in this disclosure. The term "fabric" as used in this application refers to any cloth, textile, substrate, synthetic material, natural material, knit material, woven or stretch-woven material, or other material, or any combination thereof, used to form an article of apparel and/or integrated into an article of apparel. The term "slit" or "vent-slit" as used in this application means any structure incorporated into an article of apparel that is capable of dynamically opening and closing to provide increased air flow through the article, regardless of the shape or the structure of the slit, or the layers incorporated.

BRIEF DESCRIPTION OF THE DRAWINGS

The present invention is described in detail herein with reference to the attached drawing figures, wherein:

FIG. 12 depicts a front view of a lower-body article incorporating the vent-slit pattern shown in FIG. 1, with slits in a closed configuration, in accordance with an aspect herein;

FIG. 13 depicts a rear view of the lower-body article shown in FIG. 12, with the slits in a closed configuration, in accordance with an aspect herein;

DETAILED DESCRIPTION

Figure 1:
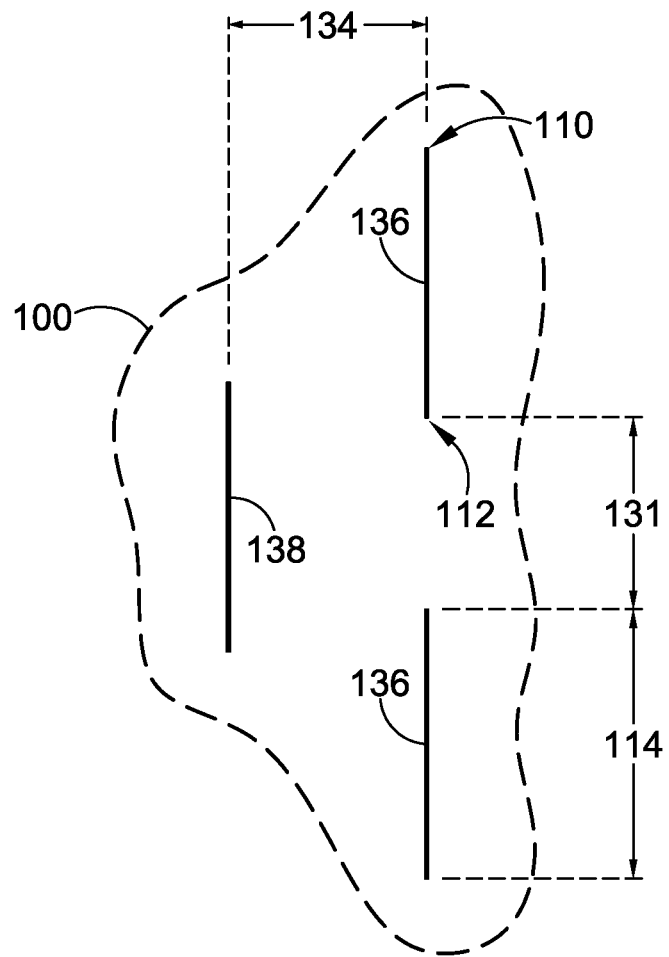
FIG. 1 depicts a close-up view of a plurality of vent-slits arranged in a repeating pattern on a fabric, in accordance with an aspect herein.

The subject matter of the present invention is described with specificity herein to meet statutory requirements. However, the description itself is not intended to limit the scope of the invention. Rather, the claimed subject matter might also be embodied in other ways to include different elements, features, components, steps, and/or combinations of steps similar to the ones described in this disclosure, and in conjunction with other present and/or future technologies.

In a broad aspect, an article of apparel incorporating a plurality of dynamic vent-slits in a repeating pattern is provided. Generally, the article may be formed from one or more fabrics each having a first surface and an opposite second surface. The article may include an integrated single-layer or multi-layer fabric formed into the article, single-layer fabrics joined together at one or more seams to form the article, or multi-layer fabrics joined together at one or more seams to form the article. In each of these cases, the slits may be formed through the first and the second surfaces of each of the fabric layers, in order to provide direct ventilation through the fabric for the wearer of the article. The slits may be arranged in one or more groupings on the article, each grouping containing the repeating pattern of slits aligned in the same direction, with the alignment of the slits in each grouping being the same or different as other groupings formed on the article.

The slits may also be formed in an article layer with sandwiching or intervening layers at least partially covering the slits. An article with the cooling slits may be formed with a base layer or other layer (or layers) positioned between the article and the wearer's skin. The base layer may be attached to the article (e.g., a piece of fabric, such as a meshed fabric, may be affixed to the article beneath the slits) or may be part of a separate under layer of the article, such as an undershirt or shorts, etc. Use of such under layers may also function to provide a color reveal effect during motion, where opening of the slits reveals the colored under layer, providing a dynamic color presentation on the article.

In exemplary aspects, the longitudinal axis of the slits may be aligned with a horizontal axis, a vertical axis, or the slits may be skewed from the vertical (or horizontal) axis of the article. Any and all such aspects, and any combination thereof, are contemplated as being within the scope herein. Moreover, the density of the slits may change in cross-sectional area or width of the pattern (e.g., increasing or decreasing the concentration of slits) as it extends across or around portions of the article. The slits may form an opening through the article such that no intermediate or surrounding layers occlude the slit openings in order to provide maximum airflow and ventilation for the wearer. In other aspects, additional layers may be incorporated between, around, and/or over or under layers into which the slits are incorporated, to provide a layered aspect to the material. The additional layers may include a different color of fabric so that when the slits are opened, at least a portion of the colored fabric may be revealed, providing a dynamic color presentation. In this aspect, the colored layers may be formed around or between the slit layer, such as in an under layer between the slit layer and a wearer's skin, and in aspects, the slit layer and the colored layers may include aligned slits so that a direct path through the slit fabric and the colored fabric is formed when the fabric is stretched perpendicular to the long-axis of the slits.

The angle of the slits with respect to a horizontal or vertical axis may be selected or optimized to take advantage of stretching forces likely to be applied to a particular portion of an article of apparel into which the slits are integrated. Multiple angle ranges may be used within the same article, or within the same grouping of slits in an article. The angles of the slits is determined by the stretching or movement forces applied to the article, which are specific to different parts of the body having different degrees of movement and different ranges of motion. For example, the long axis of any slit incorporated into the article may be aligned or angled perpendicular to an expected direction of movement of a shoulder, elbow, knee, wrist, ankle, torso, or neck area. In one exemplary slit arrangement, a shirt, pullover, or jacket includes one or more groupings of slits or slit patterns around the shoulder that are aligned at a 11-12 degree angle from a horizontal or vertical axis of the article to open the slits in response to shoulder movement. In another aspect, a short, pant, or lower body article may include slits proximate a pelvic portion of the article that are aligned at approximately a 9 degree angle from a horizontal or vertical axis of the article and extend across the pelvic portion of the article. However, any suitable angle may be used for a specific area depending on the expected movement characteristics (e.g., slits may be angled in the inclusive range of 0-360 degrees from a vertical or horizontal axis of the article in any area of the article). Additionally, in another aspect of an upper or lower body article, the slits may be positioned on an elbow area or a knee area of the article, respectively, and aligned to open in response to the direction of movement of the wearers arm or knee. In this example, the slits may be aligned perpendicular to the movement of the joint.

The basic, repeating slit pattern includes two slits in linear alignment separated by a spacing, and a slit in a non-linear alignment that is parallel to the slits in linear alignment and that is longer than the spacing, the slit in non-linear alignment overlying the spacing between the slits in linear alignment. When this repeating pattern of slits is incorporated into a fabric, and the fabric is stretched perpendicular to the long-axis of the slits, the slits open uniformly, forming raised, or three-dimensional openings in the fabric. In other words, a force applied perpendicular to the orientation or long-axis of the slits follows a non-linear path through the slits when traveling through the fabric into which the slits are incorporated. As a result, a zig-zagging, or circumventing, force path results around the slits, opening the slits uniformly and consistently.

In an exemplary aspect, the slits may be arranged into columns, the columns formed from the repeating pattern of slits extended or duplicated. "Column" as used throughout this disclosure refers to a vertical linear alignment of multiple slits with respect to the slits' longitudinal axis (see FIG. 2). To put it another way, a "column" refers to a series of aligned slits where the longitudinal axes of each slit in the column is vertically aligned. Moreover, the slits in a first column may be offset from slits in a second adjacent column and positioned such that the slits in the second column generally overlie the spacing between the slits in the first column. This reduces the formation of a linear path through the columns in a direction perpendicular to the long-axis of the slits. As such, when the fabric is stretched perpendicular to the long-axis of the slits (e.g., pulled apart), the stretch force zig-zags around the slits, weaving its way through the columns, opening the slits in the columns together, and uniformly.

This repeating pattern of slits may be used to impart mechanical stretch to woven fabrics, which usually do not have stretch characteristics unless another material, such as spandex, is incorporated. In this regard, the slit structure described herein can be used on natural or synthetic materials, and/or any woven fabric, knit fabric, or any type of composite material (e.g., knit faces with foam or mesh in between, neoprene, laminated knit or woven materials or composites, thermoplastic polymers, durable water repellent coated materials, etc.). The orientation, size, and/or arrangement of the slits may vary depending on the desired function or desired performance characteristics of the article. The slits in linear alignment in the slit pattern may be spaced apart a predefined amount, the predefined amount being uniform amongst all slits in a grouping. The slits may be large or small, tightly patterned, and/or scattered into different sections of the article. The slits may also be angled differently on different portions of the article to open in response to different directions of stretch that may be imposed on these different portions. In exemplary aspects, the slits may be configured to open due to fastening together (e.g., zipping up) portions of a shirt, jacket, pant, and/or other article of apparel, or configured to open in response to movement by a wearer.

The spacing of the slits in the repeating pattern, both in the linear orientation and in the non-linear orientation, is relatively close to allow a force applied perpendicular to the slits to distribute uniformly throughout the slit pattern without bypassing some of the slits in the pattern. In this regard, in the repeating slit pattern, as a spacing between two slits in linear alignment along a long axis of the two slits increases, and/or as a separation between the two slits and a slit in parallel with the two slits and overlying a spacing between the two slits increases, the distribution of force throughout the slit pattern is less uniform, and a stretch force applied perpendicular to the slits does not open the slits as evenly. In this regard, an exemplary ratio of slit length to spacing length is 2:1, or rather, the slits are approximately twice the length of the spacing between the slits in linear alignment. An exemplary ratio of slit length to spacing between slits in non-linear alignment is 2:1, or rather, the slits are approximately twice the length of the distance between adjacent slits in parallel, non-linear alignment. This ratio provides a compact arrangement of the slits that allows uniform opening of the slits without comprising the structural integrity of an article.

The plurality of slits may be arranged into different groupings, with each grouping including a repeating pattern of slits aligned in the same direction. The arrangement of the slits into different groupings allows the article to obtain ventilation in different areas of the article when pulled or stretched in different directions. By way of example, a first grouping of parallel columns may be located on a first part of the article, the slits in the first grouping of parallel columns arranged to open in response to a first stretch direction. A second grouping of parallel columns may be located on a second part of the article, the slits in the second grouping of parallel columns arranged to open in response to a second stretch direction. In aspects, the first stretch direction may be the same as the second stretch direction, or the first stretch direction may be different from the second stretch direction. Any and all such aspects, and any variation thereof, are contemplated as being within the scope herein. As a result, the article features multiple dynamic ventilation zones that open evenly to provide maximum ventilation to the wearer.

The structure of each slit may include a first side and a second side. In an exemplary aspect, when the slits are in a closed configuration, the first side and the second side are together, or rather, the first side lies adjacent to the second such that the sides are touching in a resting state and there is minimal to no space between the first and second sides of the slits. When a stretch force is applied perpendicular to the long-axis of the slits, at least two sets of movements occur. The first movement is along an axis that is parallel to the fabric surface and occurs when the first side and the second side move away from each other in opposite directions along this axis. The second movement is along an axis that is perpendicular to the fabric surface. With this movement, the approximate midpoints of each side of the slit move perpendicular to the fabric surface in response to the stretch force. The result of both of these movements is the formation of a three-dimensional opening through the fabric forming at least a part of the article. In other words, when a stretch force is applied perpendicular to the long axis of the slits, the sides of the slits are pulled apart and bow outward forming an oblong or ellipse-like opening through the fabric, allowing ventilation between the inside and the outside of the article. The result of these movements is that the slits may act much like a sail on a sailing boat helping to catch any wind and channel it into the vent, thereby helping to cool the wearer. In another exemplary aspect, the slits may be structured such that in a closed configuration, or resting state, there is a small gap between the first side and the second side, so that a small opening remains to provide continuous ventilation through the fabric of the article. The structure of the slits may be varied, e.g., to achieve different gap configurations during different conditions based on a desired performance characteristic.

Referring now to FIG. 1, a close-up view of a repeating vent-slit pattern 100 on a portion of material or fabric is shown, in accordance with an aspect herein. The repeating pattern 100 includes a plurality of slits 136, 138 that have a length 114. Although the length of the slits 136, 138 in the pattern 100 is shown to be approximately the same across all of the slits, in various aspects, the slits may not be exactly equal in length (e.g., may have varied lengths throughout the slit pattern). The pattern 100 shown in FIG. 1 includes two slits 136 in linear alignment, or rather, oriented end-to-end along a longitudinal axis of the slits 136, the slits 136 separated by a spacing 131 between ends of the slits 136. In various aspects, the slit spacings may be the same or varied. The pattern 100 further includes a slit 138 that is parallel with the slits 136 and in non-linear alignment with the slits 136 (i.e., not positioned along the linear axis of the slits 136, but rather, across from the slits 136 along a parallel axis that is spaced apart from the axis of the slits 136), and positioned across from the spacing 131. In FIG. 1, each end of the slit 138 extends beyond each end of the spacing 131 so that there is no linear path through all three slits 136, 138 perpendicular to the orientation of the slits 136, 138 without following a circumventing path (this is one exemplary arrangement, different sizes, positions, and lengths between the end-points of the slits and the spacings are possible). In FIG. 1, the length 114 of the slits 136, 138 is greater than the length of the spacing 131, and the spacing 134, or rather, the separation between parallel and non-linearly aligned slits 136 and 138 along an axis orthogonal to the long axis of the slits 136, 138, is less than the length 114 of the slits 136, 138. This is but one exemplary size and spacing arrangement, and others may be used, including, for example, having the ends of the non-linearly slit and the corresponding spacing between linearly aligned slits aligned end-to-end.

In FIG. 1, the length of the slits 136, 138 is approximately twice the length of the spacing 131. This repeating pattern 100 reduces the ability of a stretch force applied perpendicular to the long axis of the slits 136, 138 to travel in a linear path across the fabric. Instead, the stretch force applied perpendicular to the long-axis of the slits 136, 138 follows a non-linear, circumventing path that zig-zags around the slits 136, 138, distributing the stretch force evenly, which opens the slits uniformly and consistently for ventilation. Regarding slit spacing, in aspects, the spacing 134 may be in the inclusive range of 0.25-2 cm or 0.25-1 cm, the length of the slits 136 may be an inclusive range of 0.5-2 cm, for example (anything larger may be too big to prevent the slits from hanging open or flapping), and the length of spacing 131 may be greater than zero but less than the length of the slits 136.

Figure 2:
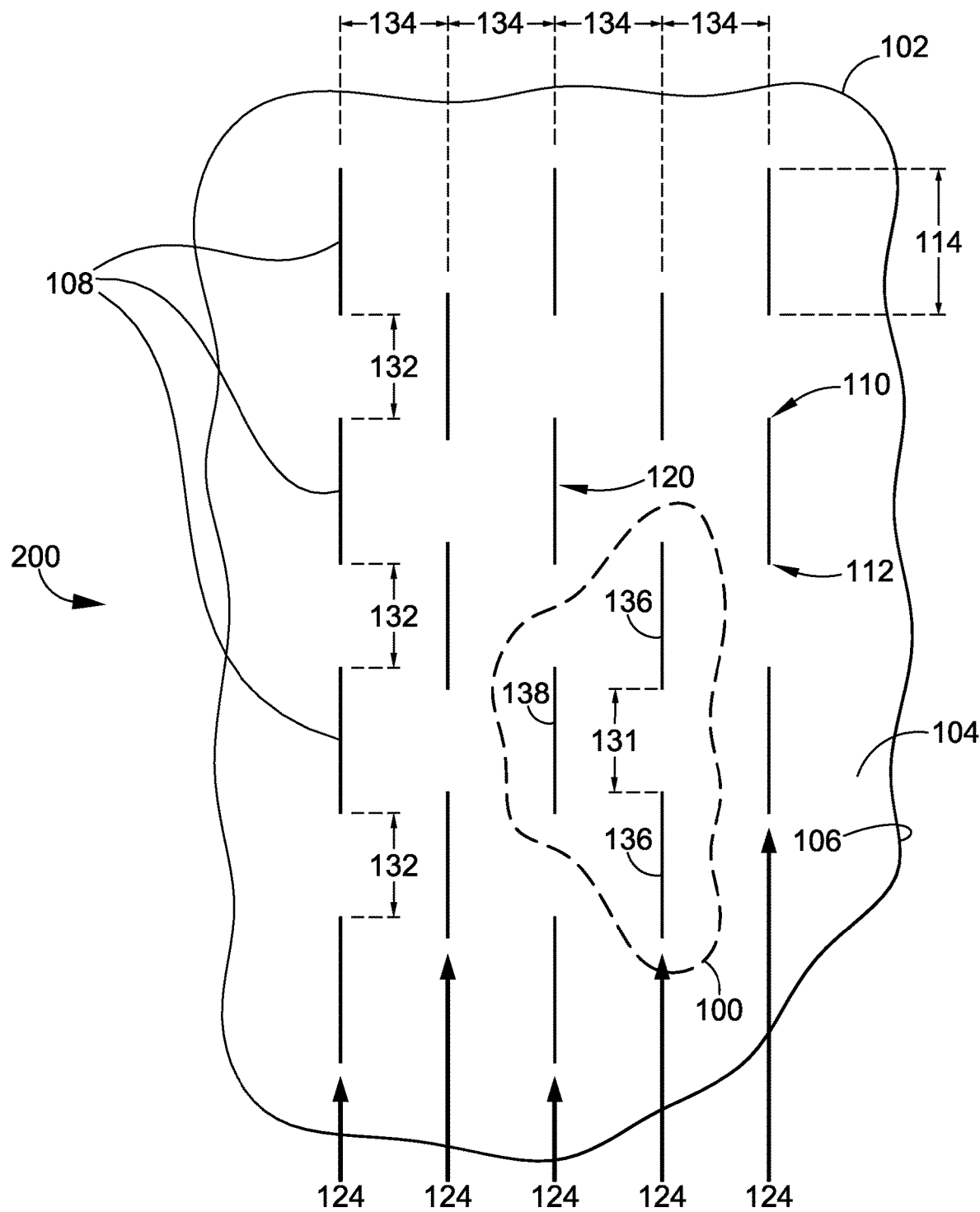
FIG. 2 depicts a first exemplary vent-slit structure formed in a fabric incorporated into an article of apparel, in accordance with an aspect of herein.

Referring now to FIG. 2, a vent-slit structure 200 incorporated into an article of apparel is shown, in accordance with an aspect of the present invention. In FIG. 2, a plurality of vent-slits 108 are incorporated into a fabric 102, forming a plurality of dynamic vent-slit structures. The fabric 102 has a first surface 104 and an opposite second surface 106. In aspects, the first surface 104 may comprise an external-facing surface of the article of apparel and the second surface 106 may comprise a skin-facing surface of the article of apparel. The slits 108 may be integrated into the fabric 102 such that they are configured to provide ventilation directly from skin of wearer to an external environment.

Accordingly, in FIG. 2, the slits 108 are shown extending entirely through the first surface 104 and the second surface 106 of the fabric 102.

The slits 108 each include a first end 110, a second end 112, and a first length 114. The slits 108 are aligned into parallel columns 124 with each column 124 being oriented along the long axis of the slits 108. Each column 124 may comprise at least two slits, such as slits 136, in linear alignment, which are shown oriented vertically in FIG. 2. The slits 108 in each of the columns are the same length 114 and the slits 108 in linear alignment in each of the columns 124 are separated by equal spacings 132. Slits offset from each other in parallel configuration, such as, for example, slit 136 and slit 138, which are in first and second columns, are separated by a column spacing 134. The slits 108 in the structure 200 include the repeating pattern 100 as depicted in FIG. 1. The repeating pattern 100 includes two slits 136 in linear alignment separated by a spacing 131, and a slit 138 in non-linear alignment with the two slits 136 and positioned adjacent to the spacing 131 such that the slit 138 is aligned in parallel configuration with the entire length of the spacing 131. By repeating the pattern 100, the vertical position of the slits 108 in adjacent columns 124 is staggered, or offset. As a result, a force applied perpendicular to the long-axis of the slits 108 distributes evenly across the slits 108, opening the slits 108 uniformly and consistently.

Figure 3:
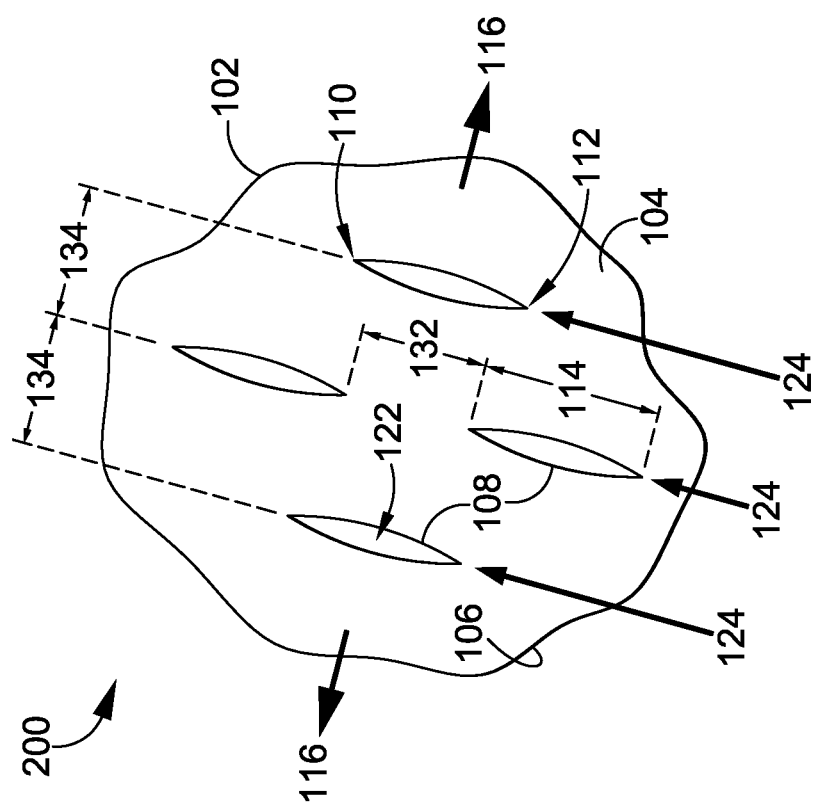
FIG. 3 depicts a close-up of a portion of the vent-slit structure shown in FIG. 2, with slits in a partially open configuration, in accordance with an aspect herein.

Referring now to FIG. 3, a close-up of a portion of the vent-slit structure 200 depicted in FIG. 2, with a force beginning to be applied to the fabric, is shown, in accordance with an aspect herein. As shown in FIG. 3, the slits 108 are incorporated into at least a portion of the fabric 102 to form the vent-slit structure 200. In FIG. 3, a stretch force 116 is applied to the fabric 102, the stretch force 116 pulling the fabric 102 perpendicular to the first length 114 of the slits 108 so that the slits 108 begin to open. Although a stretch force is shown being applied in opposite directions relative to the fabric 102, the stretch force may also be applied in a single direction relative to the fabric 102. As described in relation FIG. 2, all of the slits 108 are aligned in the same direction so that the stretching force 116 opens the slits 108 together. When the slits 108 are in the configuration 122 shown in FIG. 3, each slit 108 forms an opening through the fabric.

Figure 4B:
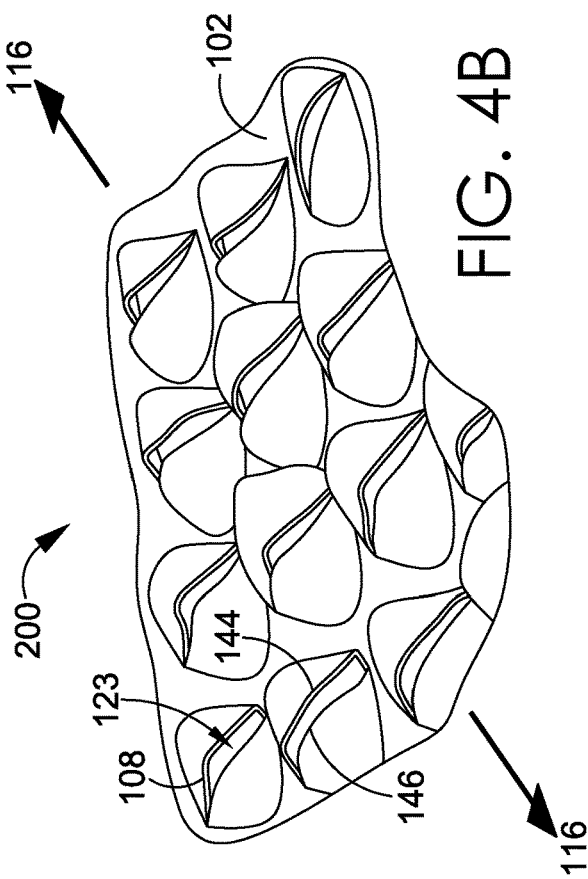
FIG. 4B depicts an angled perspective view of the fabric incorporating the vent-slit structure shown in FIG. 4A, showing a three-dimensional shape formed by the slits when the slits are in the open configuration, in accordance with an aspect herein.
Figure 4A:
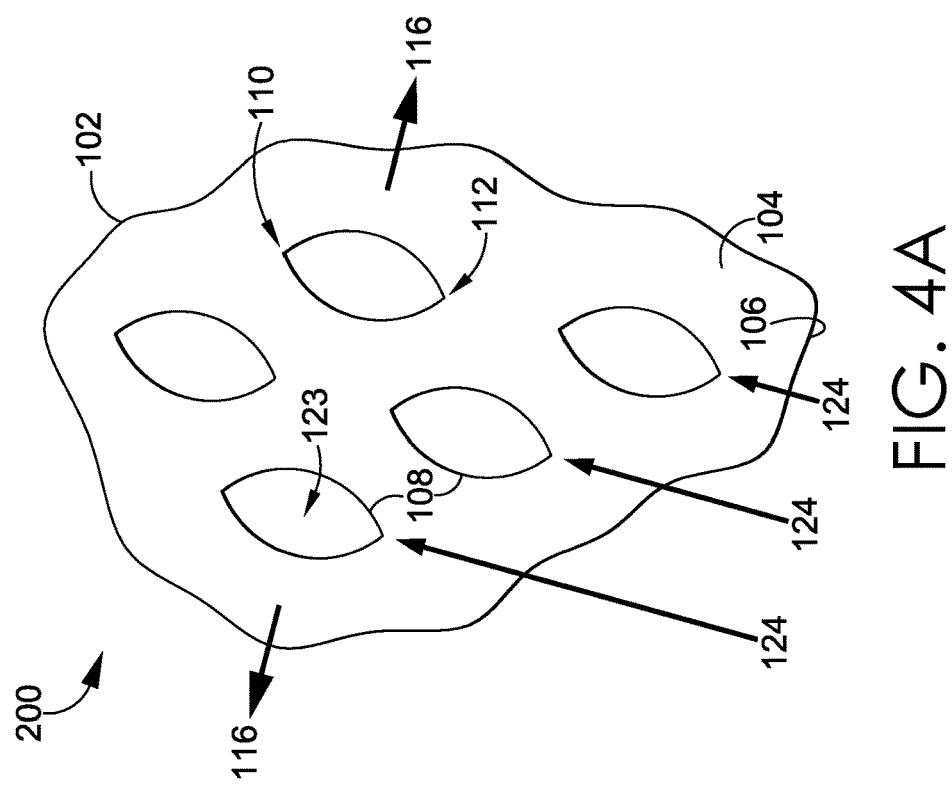
FIG. 4A depicts a close-up of the portion of the vent-slit structure shown in FIG. 2, with slits in an open configuration, in accordance with an aspect herein.

Referring now to FIG. 4A, a close-up of the portion of the vent-slit structure 200 depicted in FIG. 2, with the slits in a substantially open configuration, is shown, in accordance with an aspect herein. In FIG. 4A, the slits 108 are in an open configuration 123. In this regard, the force 116 applied perpendicular to the long-axis of the slits 108 has been distributed evenly throughout the slit structure 200, opening the slits 108 evenly, permitting ventilation through the fabric 102 into which the slits 108 are incorporated.

Referring now to FIG. 4B, an angled perspective view of the portion of the vent-slit structure 200 shown in FIG. 4A is shown, in accordance with an aspect herein. FIG. 4B depicts how the staggered nature of the slits 108 uniformly distributes the stretch force 116 evenly across the slits 108 to open the slits 108 together. Additionally, as the slits 108 are pulled open in a direction parallel to the fabric surface, the staggered nature of the slits 108 causes the stretch force 116 to open the vent slits 108 in a way that moves sides 144, 146 of the slits 108 perpendicularly outward from a surface plane of the fabric 102, providing a three-dimensional aspect to the opening 123. More particularly, the approximate mid-point of the slits 108 moves the greatest distance perpendicularly outward from the surface plane contributing to the three-dimensional shape of the vent slit 108 in the open configuration. In this regard, the raised or elevated nature of the slits 108 in an open configuration 123 helps to channel or funnel air into and out of the fabric 102, enhancing ventilation.

Figure 5B:
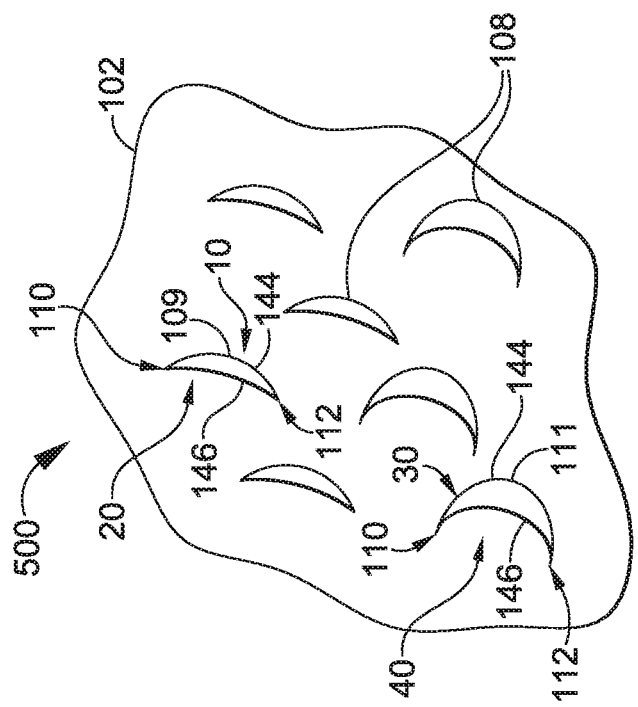
FIG. 5B depicts a selection of multiple shapes or styles of vent-slits which can be incorporated into a fabric used to form at least part of an article of apparel, in accordance with an aspect herein.
Figure 5A:
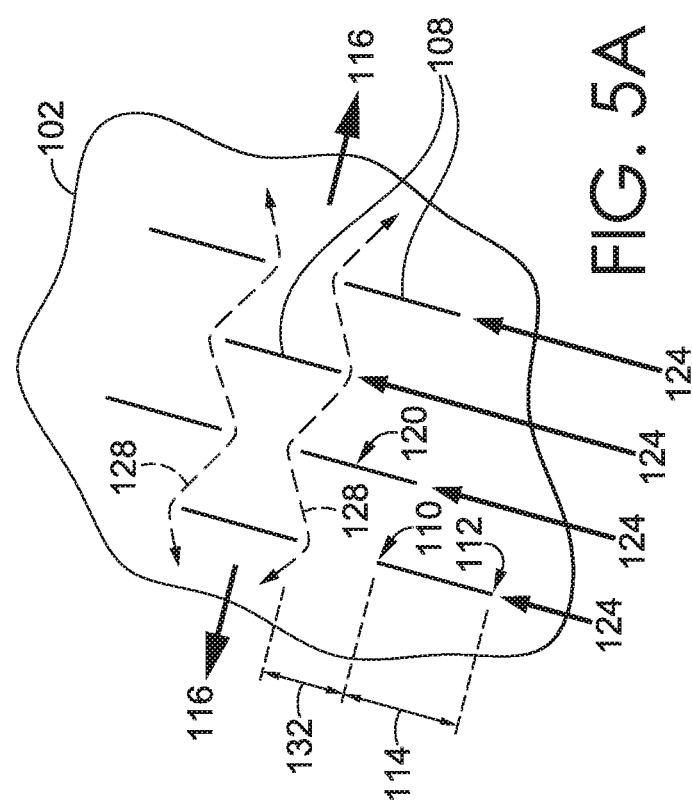
FIG. 5A depicts a close-up of a portion of the vent-slit structure shown in FIG. 2, showing a stretch force distributing across a repeating pattern of slits, in accordance with an aspect herein.

Referring now to FIG. 5A, a close-up of the vent-slit structure 200 depicted in FIG. 2, with a stretch force 116 distributed across the vent-slits, is shown, in accordance with an aspect herein. In FIG. 5A, the spacing 132 between slits in each column 124 is equal, the spacing 132 being shorter than the length 114 of each slit 108. For example, the spacing 132 between linearly aligned slits in each column 124 may be half the length 114 of the slits 108 in the columns 124. Additionally, numerous slits, such as slit 120, may be perpendicularly offset from spacings in adjacent columns such that spacings and adjacent, non-linearly aligned slits in the columns are across from each other. As shown in FIG. 5A, the stretch force 116 is applied perpendicular to the long-axis of the slits 108, and follows a circumventing or zig-zagging path 128 through and around the slits 108, to distribute the stretch force 116 evenly across the slits 108.

Referring now to FIG. 5B, a non-limiting selection 500 of shapes or styles of vent-slits which can be incorporated into a fabric used to form at least part of an article of apparel is shown, in accordance with an aspect herein. In FIG. 5B, two different slit types are shown incorporated into a fabric 102, an arc shaped slit 109, and a half moon shaped slit 111. In the open position, such slits 109, 111 may form a dome or crescent shape to provide directional venting, which may be utilized to vent heat, air, and perspiration in specific directions out of an article. These are exemplary slit variations, other widths, sizes, angles, shapes, or combinations of shapes may be used, and these exemplary slits 109, 111 may be used together, or separate or other variations may simply be used. In one example, the arc shaped slit 109 and the half-moon shaped slit 111 have at least some of the same features as the slits 108 including the first end 110, the second end 112, the first side 144, and the second side 146. Additionally, the arc shaped slit 109 includes two radii of curvature 10, 20 that respectively extend along the first and second sides 144, 146 of the arc shaped slit 109. Similarly, the half-moon shaped slit 111 also includes two radii of curvature 30, 40 that respectively extend along the first and second sides 144, 146 of the half-moon shaped slit 111. Other examples contemplate that the arc shaped slit 109 has a first radius of curvature 20 that extends along the second side 146 and decreases near the first and the second ends 110, 112 of the arc shaped slit 109. These examples further contemplate that the half-moon shaped slit 111 has a second radius of curvature 40 that extends along the second side 146 and increases near the first and second ends 110, 112 of the half-moon shaped slit 111.

Figure 6:
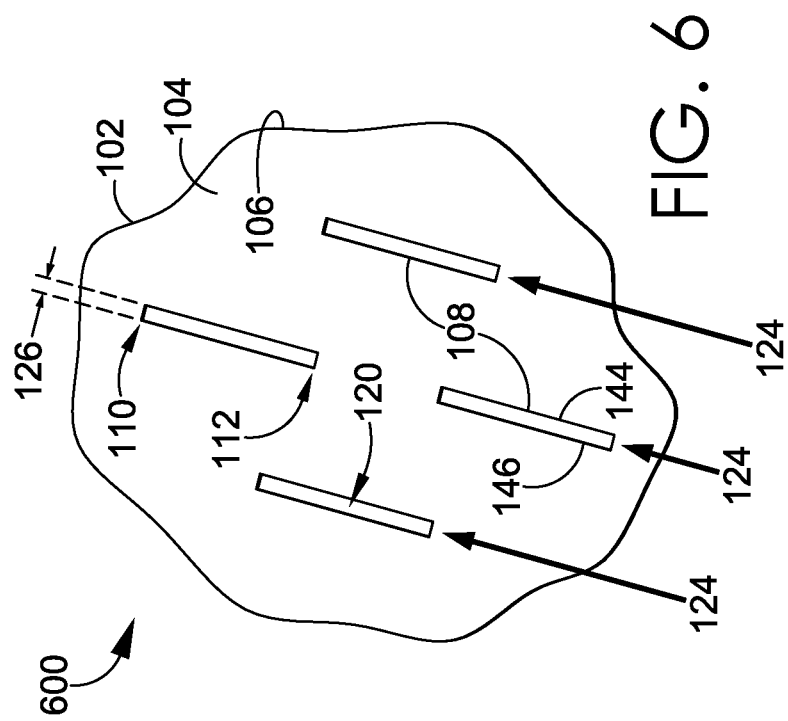
FIG. 6 depicts a close-up view of a second exemplary vent-slit structure having a substantially closed configuration with slits having first and second sides separated by a small gap, in accordance with an aspect herein.

Referring now to FIG. 6, a close-up view of an alternative vent-slit structure 600, with a gap between the slits when the slits are in a resting state, is depicted, in accordance with an aspect herein. In FIG. 6, a plurality of slits 108 are provided, with the slits 108 arranged into parallel columns 124. Each slit 108 further includes a first side 144 and a second side 146, the first and second sides 144, 146 proximate to each other when the slits 108 are in a resting state 120, as shown in FIG. 6. In the resting state 120, there is a small gap 126 between the first and second sides 144, 146 of the slits 108 that is configured to provide continuous permeability to the article of apparel. The size and shape of the gap 126 may be varied depending on the amount of continuous permeability that is desired in an article.

Figure 7:
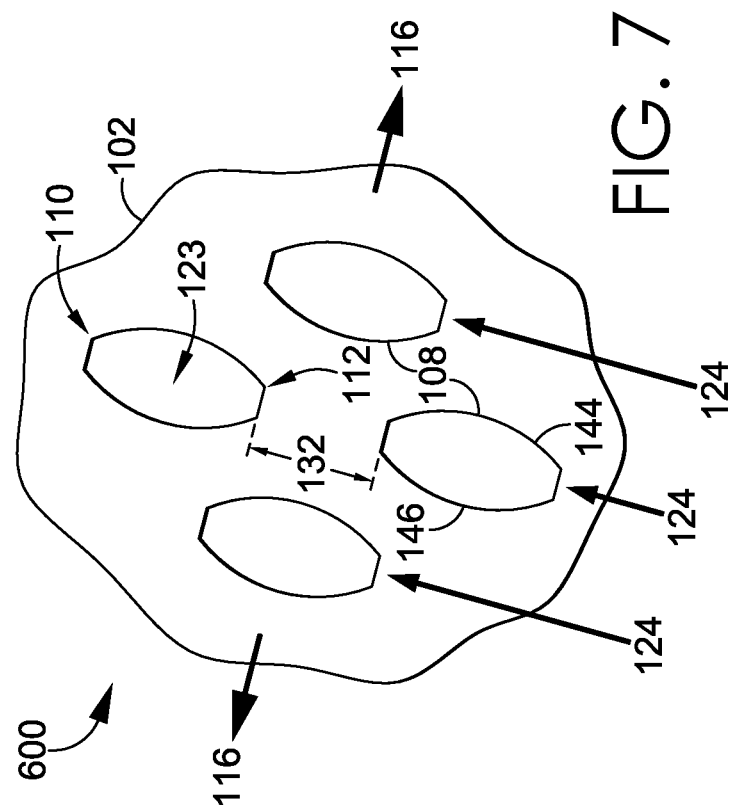
FIG. 7 depicts the vent-slit structure shown in FIG. 6 with the slits in an open configuration, in accordance with an aspect herein.

Referring now to FIG. 7, a close-up view of the vent-slit structure 600 depicted in FIG. 6, with the first and second walls in an open position, is shown, in accordance with an aspect herein. In FIG. 7, a stretch force 116 is applied to the article perpendicular to the long-axis of the slits 108, or rather, perpendicular to the orientation of the long-axis first length 114 of the slits 108. The stretch force 116 spreads the first wall 144 and the second wall 146 of the slits 108 apart along an axis that is parallel to the face of the fabric and along an axis that is perpendicular to the face of the fabric. As such, the slit 108 goes from a resting state 120 to a substantially open state 123, which is shown in FIG. 7. Once again, the slits 108 in different columns 124 are staggered vertically and are separated by an equal spacing 132 that is shorter than the long axis first length 114 of the slits 108.

Referring now to FIGS. 8-11, an article of apparel for an upper torso in the form of a shirt 800 having dynamic vent-slits incorporated into the shirt 800 is shown, in accordance with an aspect herein. The shirt 800 includes the vent-slit pattern 100 shown in FIG. 1 repeated in various portions of the shirt 800. In one exemplary aspect, the vent-slit pattern 100 extends along the sides of the shirt, around the shoulder seams, and across the back of the shirt 800. For example, a ventilated stretch zone 801 may be provided where the vent-slit pattern is formed (as shown by the dashed line surrounding the slits 820 in FIGS. 8-11). These areas of the shirt 800 are generally exposed to the most heat and moisture from a wearer, and thus positioning the slits 820 in these areas helps to ventilate the excess heat and moisture that concentrates inside the article. Additionally, these areas are typically subject to stretch forces due to the wearer, for example, reaching his/her arms forward and/or upward. Thus, by locating the slits 820 in these areas, the slits 820 can open in response to movement of the wearer, such as in response to the wearer twisting, extending, reaching, and/or running.

The shirt 800 generally includes a torso portion 802, a front side 804, a back side 806 (shown in FIG. 9), a left shoulder opening 808, and a right shoulder opening 810. A neck opening 812 and a torso opening 814 are shown at opposite ends of the torso portion 802. An optional left sleeve portion 816 may be coupled to the left shoulder opening 808 and an optional right sleeve portion 818 may be coupled to the right shoulder opening 810. Although shown as a shirt, it is contemplated herein that the article of apparel may comprise other articles of apparel for an upper torso of a wearer such as a jacket, a tank top, a camisole, a unitard, a singlet, a bra, and the like.

The shirt 800 includes a plurality of slits 820 that are aligned, or oriented, in the same direction so that the slits 820 open in the same direction when the shirt 800 is stretched perpendicular to the long-axis of the slits 820. In FIGS. 8-11, the long axis of the slits 820 is shown in a vertical orientation. This is just one exemplary orientation and this orientation may vary depending on the expected direction of stretch of the shirt 800 and the desired direction of opening of slits incorporated into the shirt 820. In alternate aspects, slits incorporated into the shirt may be grouped into different sections with the slits in each grouping aligned in the same direction, and/or may be angled relative to the vertical axis of the shirt, to provide directional force based venting.

Figure 9:
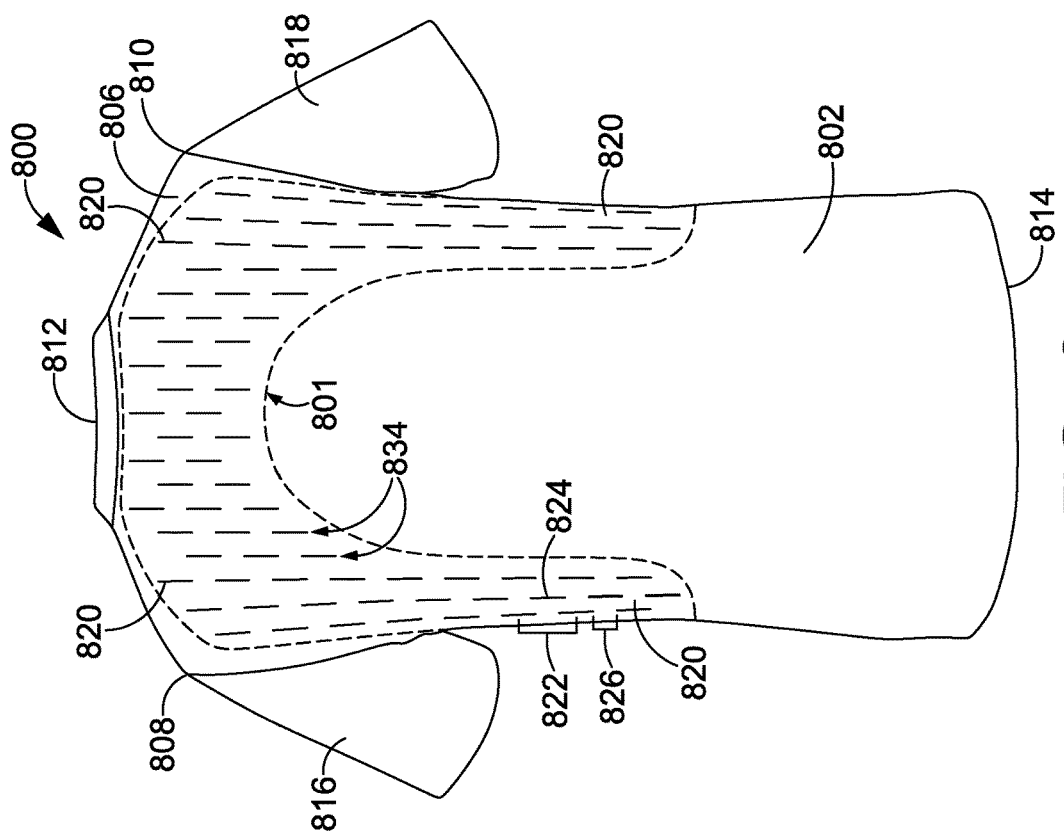
FIG. 9 depicts a rear view of the shirt shown in FIG. 8, with the slits in a closed configuration, in accordance with an aspect herein.
Figure 8:
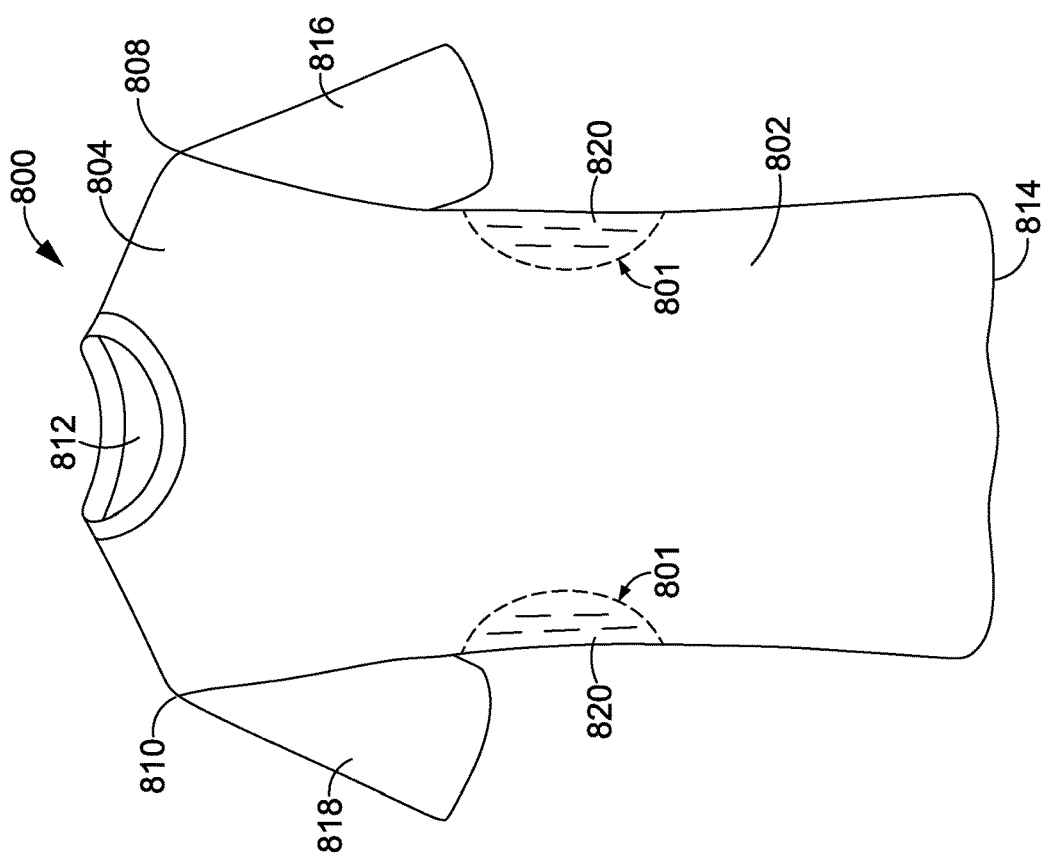
FIG. 8 depicts a front view of a shirt incorporating the vent-slit pattern shown in FIG. 1, with slits in a closed configuration, in accordance with an aspect herein.

Referring now to FIG. 9, a rear view of the shirt 800 incorporating the vent-slit pattern 100 of FIG. 1, with the slits in a closed configuration, is shown, in accordance with an aspect herein. In FIG. 9, a spacing 826 between adjacent slits 822 in linear alignment is less than a length of a slit 824 in parallel and non-linear alignment with the adjacent slits 822, and overlying the spacing 826 between the adjacent slits 822. The spacing 826 between slits 820 is shorter than the length of the slits 820. The slits 820 are shown arranged into columns 834. As described herein, the slits 820 in adjacent columns 834 are staggered, so that slits 820 are aligned across from the spacings 826. In this arrangement, there is no linear path perpendicular to the slits 820 passing through more than one spacing 826. This permits a stretch force applied perpendicular to the slits 820 to be distributed in multiple directions across multiple slits 820. In other words, because of the pattern of the slits 820, the stretch force does not bypass any of the slits 108. This results in a uniform and consistent opening of the slits 820. It should be noted that the size, arrangement, and alignment of the slits 820 shown in FIGS. 8-12 is provided as a non-limiting example. Multiple configurations, arrangements, and sizes of the slits 820 on the shirt 800 are possible and contemplated. Different groupings of the slits may be formed on the shirt, with the slits in each grouping aligned perpendicular to an expected direction of stretch.

Figure 10:
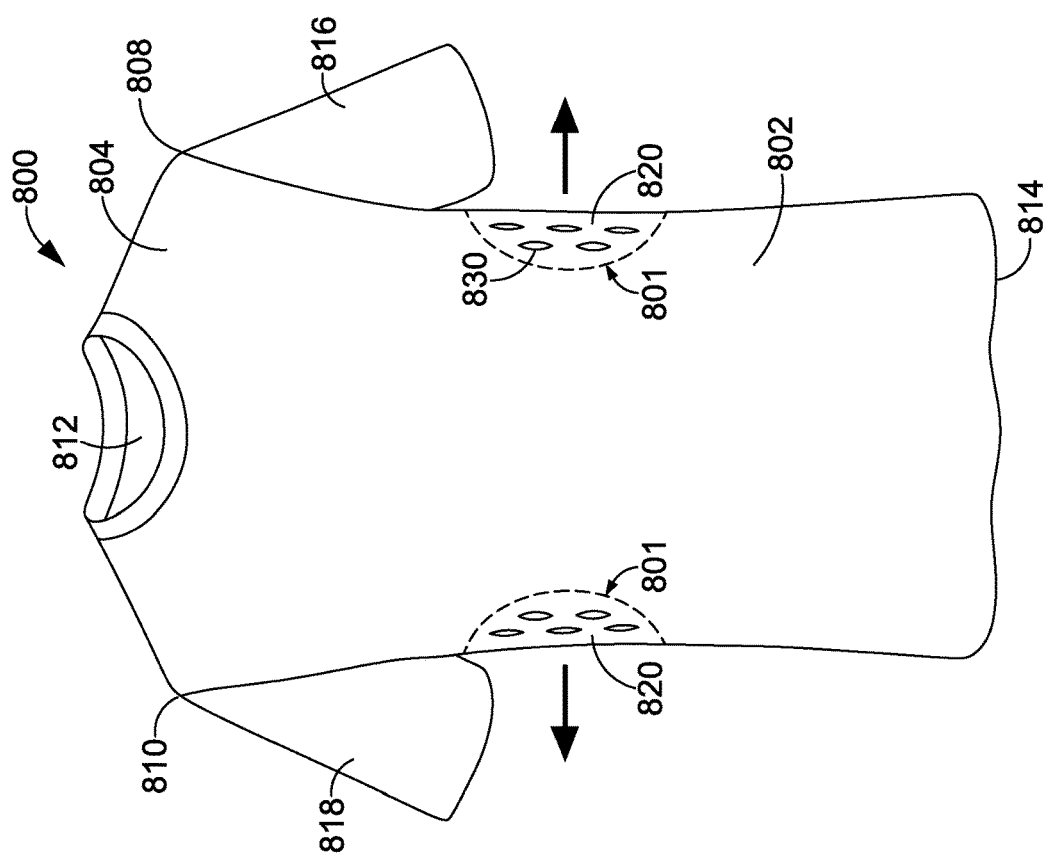
FIG. 10 depicts a front view of the shirt shown in FIG. 8, with the slits in an open configuration, in accordance with an aspect herein.

Referring now to FIG. 10, a front view of the shirt 800 incorporating the pattern 100 of FIG. 1, with the slits in an open configuration, is shown, in accordance with an aspect herein. In FIG. 10, the slits 820 are aligned, opening in the same direction. A stretch force 832 is shown being applied to the shirt 800 in a direction perpendicular to the long-axis of the slits 820. The stretch force 832 is shown pulling the slits 820 into an open configuration 830. This type of stretch force may be initiated when, for example, a wearer of the shirt 800 moves in such a way that the back of the shirt 800 is stretched, such as by reaching forward to grab the handles of a bicycle, by propelling the arms forward when running, or by swinging a bat. When the slits 820 change into the open configuration 830, dynamic ventilation is provided. Because the vertical position of the slits 820 is staggered between columns 834, as described herein, the force 832 does not simply pass through the columns via the spacings 826. Instead, the force 832 travels in a circumventing or zig-zagging path through the columns 834 and around the slits 820, distributing the force 832 across the slits 820, opening the slits uniformly.

Figure 11:
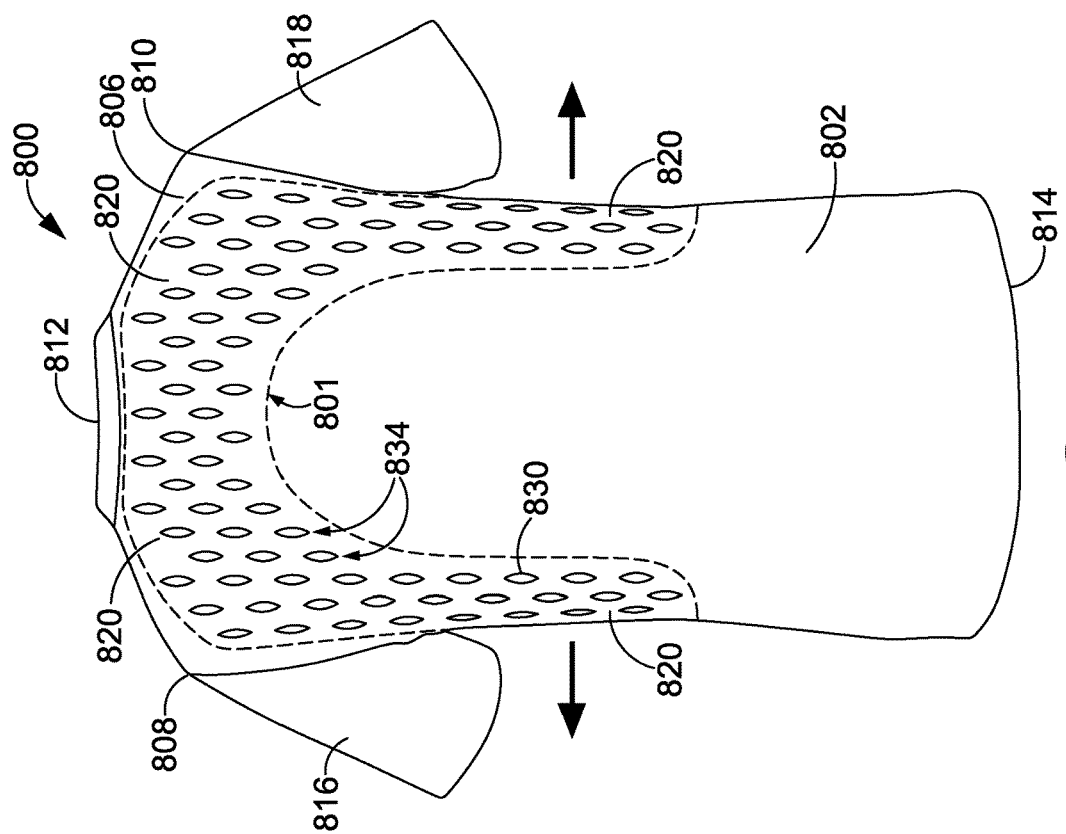
FIG. 11 depicts a rear view of the shirt shown in FIG. 8, with the slits in an open configuration, in accordance with an aspect herein.

Referring to FIG. 11, a rear view of the shirt 800 incorporating the pattern 100 of FIG. 1, with the slits in an open configuration, is shown, in accordance with an aspect herein. As shown in FIG. 10, the slits 820 are in parallel alignment, arranged such that they open in the same direction. The stretch force 832 applied to the shirt 800 opens the slits 820 perpendicular to the long-axis of the slits 820, moving the slits 820 into the open configuration 830 until the stretch force is no longer applied, at which time, the slits revert to their closed configuration. The slits 820 shown in FIGS. 8-11 are depicted being relatively large in size for demonstration and clarity purposes.

In implementations, the slits 820 incorporated into the shirt 800 and/or another article of apparel may be smaller and/or more narrowly spaced, to provide a larger cross-section of dynamic vent-slits. Moreover, the slits 820 in FIG. 11 are shown connected across the back-side 806 of the shirt 800 to provide a dynamic ventilation element that extends from about the left shoulder opening 808 to about the right shoulder opening 810. However, in exemplary implementations, the slits 820 may be separated into different groupings and/or located on different areas of the shirt 800, and/or skewed from a vertical or horizontal axis in different directions. The different groupings may also be oriented in different directions to provide dynamic opening of the slits 820 in each grouping in response to specific directions of stretch. Numerous options and/or arrangements are possible and contemplated, incorporating the structures described herein, to provide a shirt and/or article with dynamic slits.

Referring now to FIG. 12, a front view of an article of apparel 1200 incorporating the vent-slit pattern 100 of FIG. 1 in a repeating fashion, with the slits in a closed configuration, is shown, in accordance with an aspect herein. In FIG. 12, the article 1200 includes a pelvic portion 1202, a front side 1203, a back side 1234 (shown in FIG. 13), a right leg portion 1204, and a left leg portion 1206. The article 1200 includes a waist opening 1208, as well as a right leg opening 1210 and a left leg opening 1212. The article 1200 also generally includes a right side 1214, a left side 1216, a right leg inner portion 1218, a left leg inner portion 1220, and a groin area 1222 at which the right inner leg portion 1218 and the left inner leg portion 1220 intersect. Although shown as a short, it is contemplated that the article may comprise a pant, a half-pant, a capri, a unitard, a singlet, and the like.

The article 1200 further includes a plurality of slits 1240 arranged in a repeating fashion, the slits 1240 forming a plurality of parallel columns 1242 oriented along the long axis of the slits 1240. In one exemplary aspect, the columns 1242 are positioned proximate the groin area 1222 where first and second inner leg portions 1218, 1220 join together, and extend upward from the groin area 1222 at an approximately 45-degree angle from the vertical axis of the article 1200. The columns 1242 include a first front grouping 1224 extending upward toward the right side 1214 of the article 1200 and a second front grouping 1226 extending upward toward the left side 1216 of the article 1200. In this aspect, the long axis of the slits 1240 is in a vertical orientation, parallel with the vertical axis of the article 1200. By orienting the slits 1240 in this fashion, the slits 1240 may open in response to a stretch force oriented perpendicular to the long-axis of the slits 1240. The long axis of the slits 1240 may be oriented in any number of directions across one or multiple groupings of slits 1240, to provide dynamic ventilation for different areas of the article in response to different directions of stretch. This is just one exemplary arrangement of slits, and it is contemplated herein that the slits 1240 may be arranged in different groupings over different portions of the article 1200. It should be noted that the leg portions 1204, 1206 may extend part or all the way to respective left and right ankles of the wearer, forming shorts, pants, capris, and the like. In such an arrangement, the slits 1240 may be positioned throughout the leg portions, to provide additional dynamic ventilation for the legs of a wearer.

In FIG. 12, the columns 1242 are arranged such that a stretch force applied to the article 1200 perpendicular to the long-axis of the slits 1240 passing through a spacing 1228 between slits 1230 in linear alignment cannot pass through subsequent spacings 1228 without changing direction, circumventing and zig-zagging around an adjacent slit 1232 in non-linear alignment parallel to the slits 1230 in linear alignment. As a result, the slits 1240 open uniformly. This stretch force can occur in response to movement by a wearer of the article. For example, the movement of the wearers legs in an anterior-to-posterior direction as in running or in a side-to side-direction can provide a stretch force perpendicular to the slits 1240, opening the slits 1240 and providing ventilation to the groin or waist area of the wearer. As discussed, different groupings of the slit pattern may be oriented in different directions and on different areas of the article 1200, so that the slits 1240 open in response to different directions of movement, and/or different directions of stretch. Moreover, the skewing of the orientation of the slits 1240 or changing the density of the slits 1240 in a particular area allows varied ventilation characteristics across the article 1200 as well.

Additional groupings of slits may be located on the article 1200 to provide dynamic ventilation on or across different portions of the lower body article 1200. The angles of the slits in the lower body article may be determined by the stretching or movement forces expected to be applied to the article. This is specific to different parts of the body having different degrees of movement and different ranges of motion. In one exemplary lower body article aspect, a short, pant, or lower body article may include slits proximate a pelvic portion of the article that are aligned at approximately a 9 degree angle from a horizontal or vertical axis of the article. However, any suitable angle may be used (e.g., in the inclusive range of 0-360 degrees). Additionally, in one aspect of the lower body article, the slits may be positioned on a knee area of the article and aligned to open in response to the direction of movement of the wearers arm or knee.

The columns 1242 in FIG. 12 are shown with varying numbers of slits 1240, each of the slits 1240 aligned in the same direction, such that they open in the same direction. In this example, the slits 1240 are all equal in length, and the columns 1242 are spaced equally. As described herein, the spacing 1228 between two slits 1230 in linear alignment is less than the length of a slit 1232 positioned parallel to and across from the spacing 1228 and in non-linear alignment with the slits 1230. In this regard, all of the slits 1240 are approximately twice the length of any spacing 1228 between adjacent slits 1230. The spacing 1244 between columns 1242 may be less than the length of the slits 1240, and is ideally half the length of each of the slits 1240. In this regard, the slits 1240 are organized such that a force applied perpendicular to the orientation of the slits 1240 must follow a non-linear path through the columns 1242. As shown in FIG. 12, the vertical position of the slits 1240 in adjacent columns 1242 is staggered, or offset, so that in at least some of the columns, a spacing 1228 is across from a slit 1232 in non-linear alignment with the spacing 1228.

Referring now to FIG. 13, a rear view of the lower body article 1200 depicted in FIG. 12, with the slits in a closed configuration, is shown, in accordance with an aspect herein. The back side 1234 of the article 1200 includes the columns 1242 forming a first rear grouping 1236 and a second rear grouping 1238, which generally correspond to the first front grouping 1224 and the second front grouping 1226. In this regard, the columns 1242 are continuous between the front side 1203 and the backside 1234 of the article 1200 along an inner margin of the article 1200, and extend upward at approximately a 45-degree angle from the longitudinal axis of the article 1200, similar to the arrangement on the front 1203 of the article 1200. The slits 1240 are configured to provide ventilation to a pelvic/groin region of a wearer of the article 1200.

Figure 14:
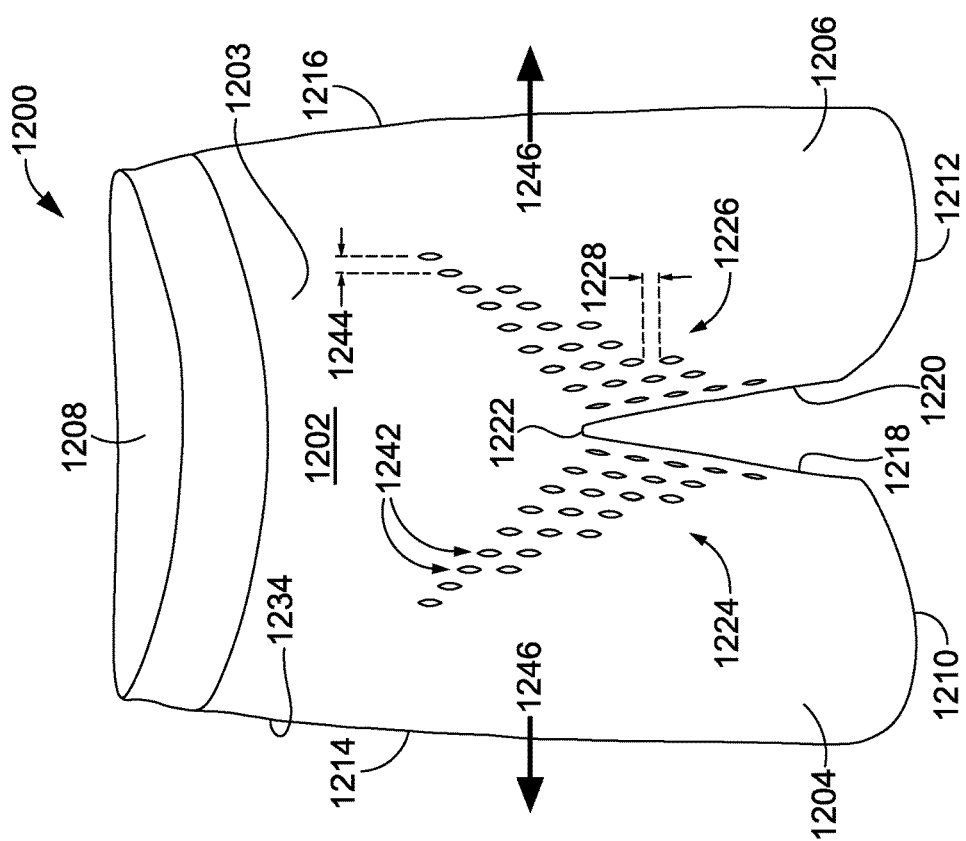
FIG. 14 depicts a front view of the lower-body article shown in FIG. 12, with the slits in an open configuration, in accordance with an aspect herein.

Referring now to FIG. 14, a front view of the lower body article 1200 depicted in FIG. 12, with the slits in a substantially open configuration, is shown, in accordance with an aspect herein. In FIG. 14, the article 1200 is stretched by a stretch force 1246 oriented perpendicular to the longitudinal axis of the article 1200, and also perpendicular to the long-axis of the slits 1240 forming parallel columns 1242 on the article 1200. As shown in FIG. 14, the stretch force 1246 opens the slits 1240 to provide dynamic ventilation for the wearer of the article 1200. The slits 1240 may extend from the groin portion all throughout the article 1200. As a further example, the slits 1240 forming the columns 1242 may extend upward all the way to the sides 1214, 1216 and/or all the way to the waist opening 1208 of the article 1200. Any and all such aspects, and any variation thereof, are contemplated as being within the scope herein.

Figure 15:
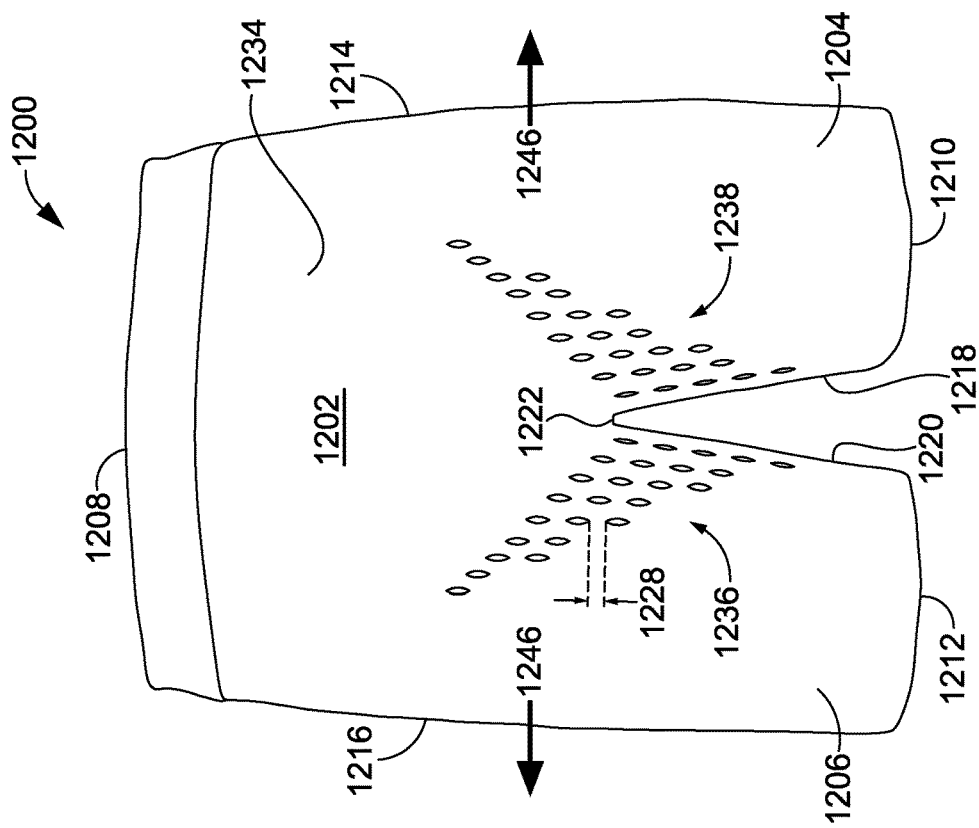
FIG. 15 depicts a rear view of the lower-body article shown in FIG. 12, with the slits in an open configuration, in accordance with an aspect herein.

Referring now to FIG. 15, a rear view of the lower body article 1200 depicted in FIG. 12, with the slits in a substantially open configuration, is shown, in accordance with an aspect herein. Similar to FIG. 11, the stretch force 1246 is shown pulling the article 1200 perpendicular to the longitudinal axis of the article, opening the slits 1240. Once again, because of the staggered, vertical arrangement of the slits 1240 between the columns 1242, the shorter length of the spacings 1228 versus the slits 1240, and the closeness of the columns 1242, the force 1246 is transferred through the columns 1242 in a zig-zagging fashion, circumventing the slits 1240. This circumventing, non-linear path allows uniform distribution of the force 1246 across the slits 1240, allowing the slits 1240 to open consistently, as shown in FIGS. 14 and 15.

As with the shirt 800, the article 1200 is shown with slits 1240 in one configuration. Multiple configurations, arrangements, groupings, and/or numbers of slits may be used, as with the shirt 800. In this example, the slits 1240 are shown relatively large in size, with relatively large spacings 1228, and the columns 1242 located in one general area, with all the columns 1242 aligned in one direction. In implementations, slits used on the shirt 800 and/or the lower body article 1200 may be shorter, longer, more tightly packed together, and/or arranged into more or fewer columns, or have different orientations among different groupings, among other arrangements.

Figure 16:
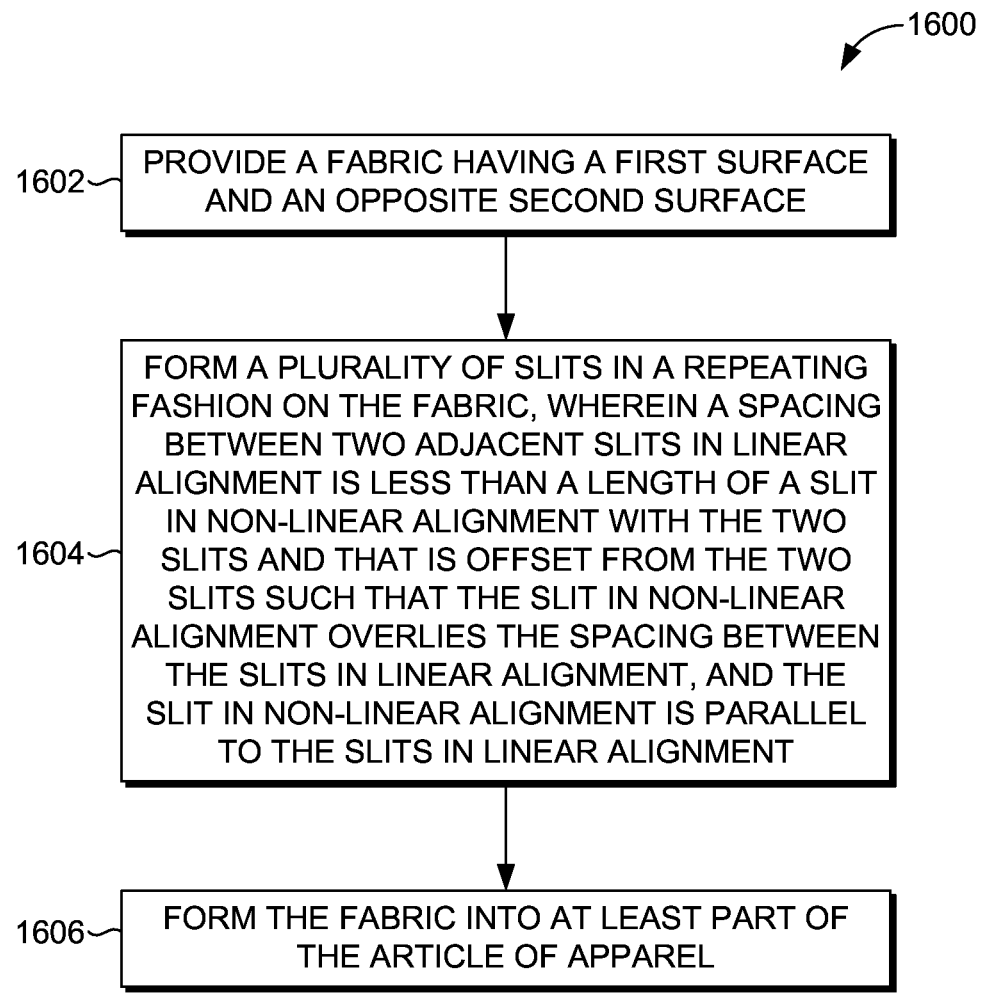
FIG. 16 depicts a flow chart of a first exemplary method of manufacturing an article of apparel incorporating a vent-slit structure, in accordance with an aspect herein.

Referring now to FIG. 16, a flow diagram of an exemplary method 1600 of manufacturing a vented article of apparel such as the shirt 800 or the lower body article of apparel 1200 is shown, in accordance with an aspect herein. At a first block 1602, a fabric, such as the fabric 102 shown in FIG. 2, is provided, the fabric having a first surface and an opposite second surface, such as the first surface 104 and the second surface 106 shown in FIG. 2. At a second block 1604, a plurality of slits, such as the plurality of slits 108 shown in FIG. 2, are formed in a repeating fashion, such as in the repeating pattern 100 shown in FIG. 1, on the fabric. In the repeating pattern, a spacing, such as the spacing 131 shown in FIG. 1, between two adjacent slits in linear alignment, such as slits 136 shown in FIG. 1, is less than a length of a slit in non-linear alignment with the two slits, such as slit 138 in FIG. 1, and that is offset from the two slits such that the slit in non-linear alignment overlies the spacing between the slits in linear alignment, and the slit in non-linear alignment is parallel to the slits in linear alignment. At a third block 1606, the fabric is formed into at least part of the article of apparel.

The slits may be integrated or formed into a predetermined or preconfigured portion of the fabric, such as around or across seams of the article, on the front, back, or sides of the article, or be grouped into circular, square, rectangular, or trapezoidal sections in one or more locations on the article. Each grouping may vary in cross-sectional area along the vertical axis or the horizontal axis of the article, or both. The longitudinal axis of the slits may be oriented along a horizontal axis, a vertical axis, or be skewed from the horizontal or vertical axis across the article. Additionally, each grouping of slits may have the slits oriented in one or multiple directions within the grouping, and may include a gradual change in the angle, or orientation, of the slits as the slit structure extends across the article, to provide ventilation in response to varying directions of stretch. For example, a grouping of slits may be oriented proximate seams joining sections of fabric forming the article, with the slits oriented such that they open in response to the sections moving apart, such as, for example, between a torso portion and an arm portion of a shirt, so that the underarm area of the shirt stretches and ventilates when a wearer raises an arm over her head. Moreover, the raised surface created on each side of the fabric when the vent-slits are open helps to channel air into and out of the article, enhancing ventilation.

Figure 17:
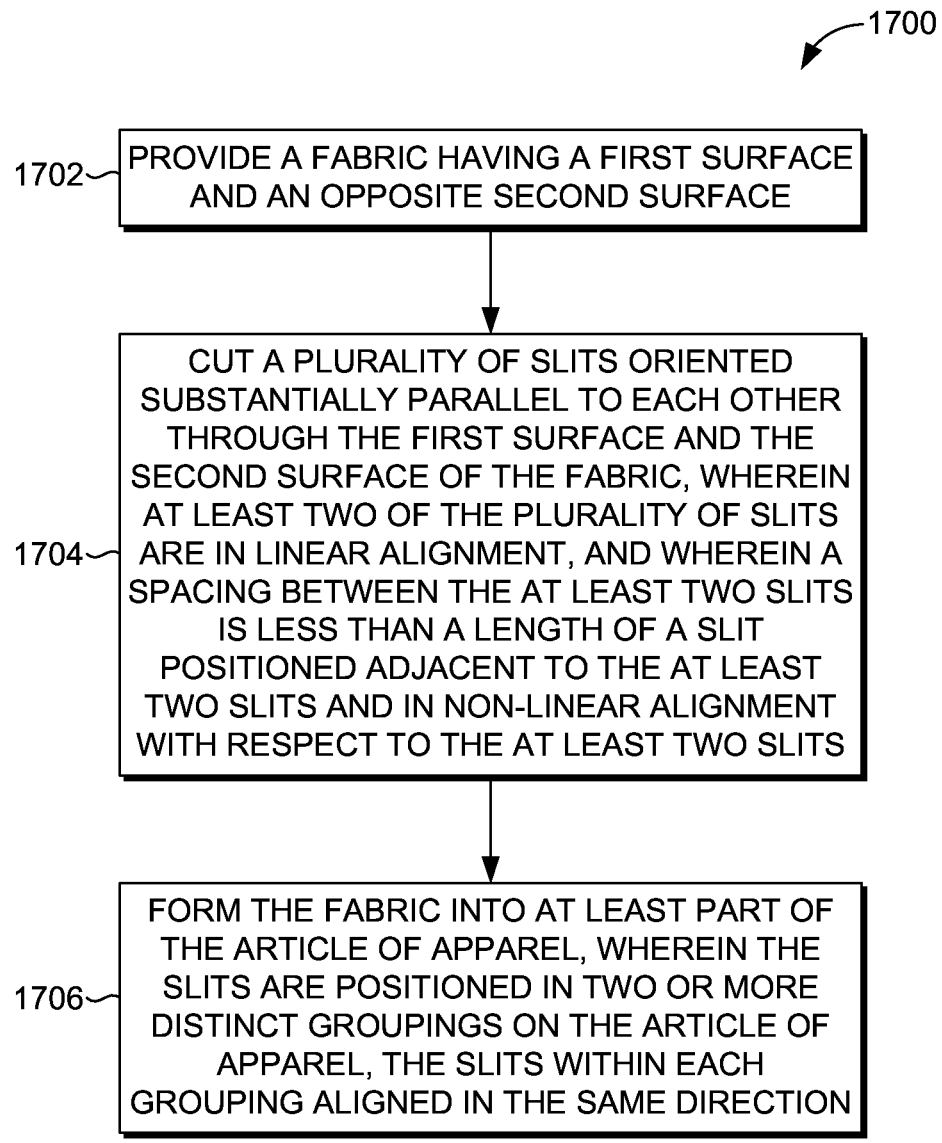
FIG. 17 depicts a flow chart of a second exemplary method of manufacturing an article of apparel incorporating a vent-slit structure, in accordance with an aspect herein.

Referring now to FIG. 17, a flow chart of an exemplary method 1700 of manufacturing a vented article of apparel is shown, in accordance with an aspect herein. At a block 1702, a fabric, such as the fabric 102 shown in FIG. 2, having a first surface and a second surface, such as the first surface 104 and the second surface 106 shown in FIG. 2, is provided. At a block 1704, a plurality of slits oriented substantially parallel to each other, such as the slits 108 shown in FIG. 2, are cut through the first surface and the second surface of the fabric, wherein at least two of the plurality of slits are in linear alignment, such as slits 136 in FIG. 1, and wherein a spacing between the at least two slits is less than a length of a slit positioned adjacent to the at least two slits and in non-linear alignment with respect to the at least two slits. At a block 1706, the fabric is formed into at least part of an article of apparel, with the slits positioned in two or more distinct groupings on the article of apparel, the slits within each grouping aligned in the same direction.

The slits may be cut manually, mechanically (e.g., knife machine), or by laser (e.g., laser cutting machine), ultrasonic (e.g., ultrasonic cutting machine), water jet cutting, die cutting, and the like. The plurality of slits may be arranged such that there are at least two slits in linear alignment, such as the slits 136 in FIG. 2, wherein a spacing, such as the spacing 131 in FIG. 2, between the slits in linear alignment is less than a length of a slit positioned adjacent to the at least two slits, such as the adjacent slit 138 shown in FIG. 2, and in non-linear alignment with respect to the at least two slits.

Figure 18:
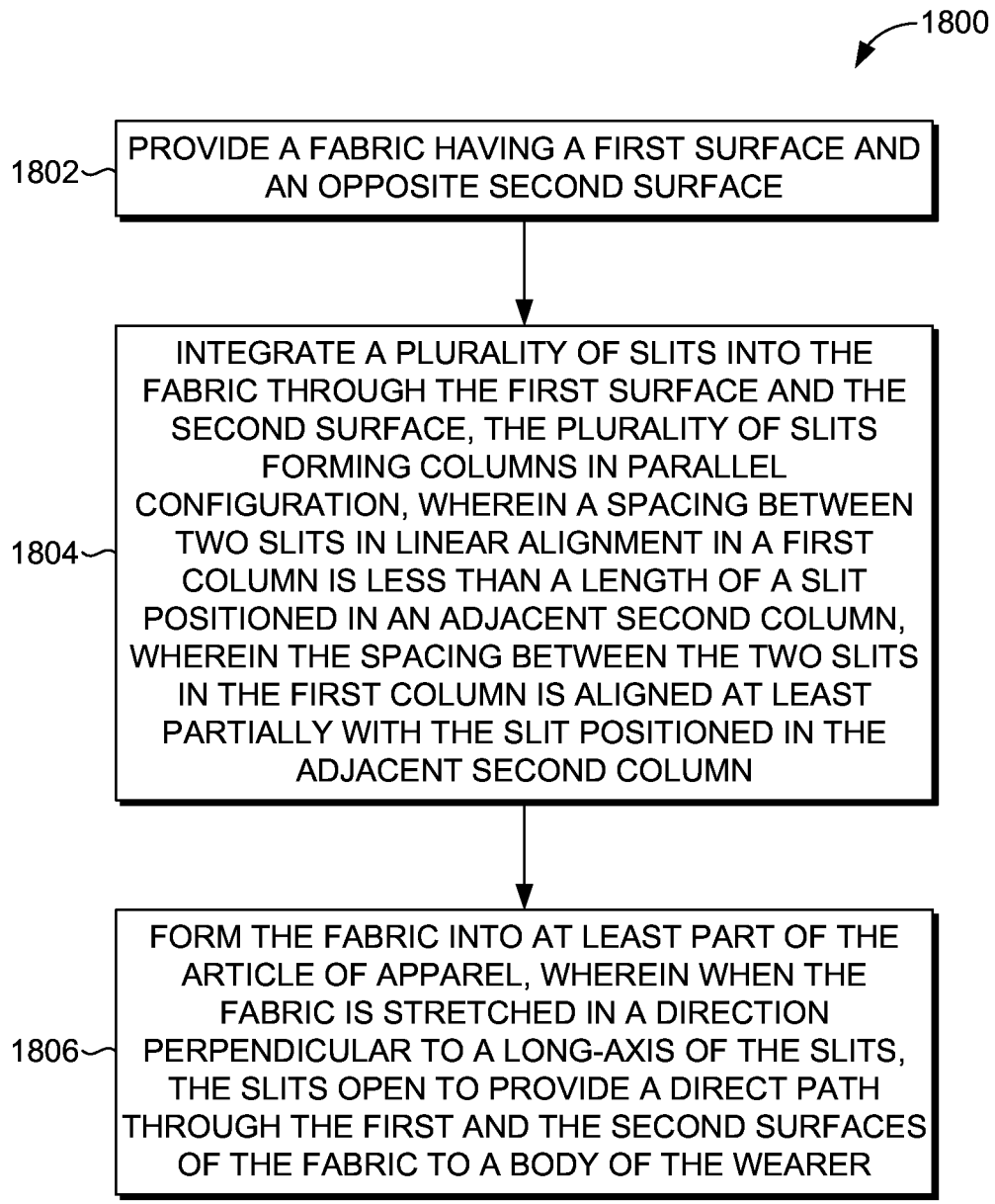
FIG. 18 depicts a flow chart of a third exemplary method of manufacturing an article of apparel incorporating a vent-slit structure, in accordance with an aspect herein.

Referring to FIG. 18, an exemplary method 1800 of manufacturing a modified article of apparel is shown, in accordance with an aspect herein. At a block 1802, a fabric, such as the fabric 102 shown in FIG. 2, having a first surface and a second surface, such as the first surface 104 and the second surface 106 shown in FIG. 2, is provided. At a block 1804, a plurality of slits, such as the slits 108 shown in FIG. 2, are integrated into the fabric through the first surface and the second surface, the plurality of slits forming columns, such as the columns 124 shown in FIG. 2, in parallel configuration, with a spacing, such as spacing 131 in FIG. 2, between two slits in linear alignment in a first column, such as slits 136 in FIG. 2, less than a length of a slit, such as slit 138 in FIG. 2, in an adjacent second column, with the spacing in the first columns aligned at least partially with the slit positioned in the second column. At a block 1806, the fabric is formed into at least part of the article of apparel, wherein when the fabric is stretched perpendicular to the orientation of the slits, the slits open to provide a direct path through the first and the second surfaces of the fabric to a body of the wearer.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible aspects may be made of the invention without departing from the scope thereof, it is to be understood that all matter herein set forth or shown in the accompanying drawings is to be interpreted as illustrative and non-limiting.

The invention claimed is:

1. A method of manufacturing an article of apparel, the method comprising:
   providing a fabric having a first surface and an opposite second surface;
   cutting a plurality of slits in the fabric, the plurality of slits comprising at least a first slit in linear alignment with a second slit and a third slit parallel to but offset from the first slit and the second slit and positioned such that the third slit overlies a spacing between the first slit and the second slit,
   wherein the plurality of slits cut in the fabric form a repeating pattern across the fabric, wherein each of the plurality of slits includes a first end, a second end, a first side, and a second side, wherein the first side and the second side both extend from the first end to the second end, and wherein the plurality of slits provide a substantially open configuration when the fabric is in a stretched state in which a stretching force is applied to the fabric,
   wherein when the fabric is in an unstretched state the first slit has a first shape partially defined by a first radius of curvature that extends along the second side of the first slit and decreases near the first end and the second end of the first slit and the second slit has a second shape partially defined by a second radius of curvature that extends along the second side of the second slit and increases near the first end and the second end of the second slit, the first radius of curvature being different than the second radius of curvature; and
   forming the fabric into at least part of the article of apparel, wherein the fabric is in the unstretched state when formed into at least part of the article of apparel.

2. The method of claim 1, wherein the repeating pattern comprises:
   a first column of slits in linear alignment, wherein each of the first slit and the second slit are positioned in the first column of slits; and
   a second column of slits in linear alignment, the second column of slits extending in parallel to, and offset from, the first column of slits, wherein the third slit is positioned in the second column of slits.

3. The method of claim 2, wherein each slit of the first column of slits is spaced apart a first distance, wherein each slit of the second column of slits is spaced apart the first distance.

4. The method of claim 3, wherein the first distance is shorter than a length of each slit of the plurality of slits.

5. The method of claim 4, wherein the first column of slits is offset from the second column of slits by a second distance that is shorter than the length of each slit of the plurality of slits.

6. The method of claim 2, wherein a slit in each column is aligned perpendicular from a portion of a long axis of a slit in an adjacent column.

7. The method of claim 2, wherein the article of apparel comprises at least one of:
   a woven fabric; and
   a knit fabric.

8. The method of claim 1, wherein the plurality of slits are skewed from a vertical axis of the article of apparel and form a direct path between a wearer's skin and an outside environment of the article of apparel.

9. The method of claim 1, further comprising forming at least a portion of the plurality of slits using one of the following techniques:
   knife cutting;
   ultrasonic cutting;
   die-cutting; or
   laser cutting.

10. The method of claim 1, wherein the fabric comprises at least one of:
    a natural fiber;
    a synthetic fiber; or
    a blend of natural and synthetic fibers.

11. The method of claim 1, wherein the fabric comprises at least one of:
    a woven fabric; and
    a knit fabric.

12. The method of claim 1, wherein the first slit is arc-shaped when in the unstretched state.

13. The method of claim 1, wherein the second slit is half-moon shaped when in the unstretched state.

14. The method of claim 1, wherein the first shape and the second shape are arcuate shapes.

15. The method of claim 14, wherein a line extending between the first end and the second end of the first slit is normal to a direction of venting of the first slit.

16. The method of claim 1, wherein the first slit has a first crescent shape and the second slit has a second crescent shape when the fabric is in the stretched state.

17. A method of manufacturing an article of apparel, the method comprising:
    providing a fabric having a first surface and an opposite second surface;
    cutting a plurality of slits in the fabric, the plurality of slits comprising at least a first slit in linear alignment with a second slit and a third slit parallel to but offset from the first slit and the second slit and positioned such that the third slit overlies a spacing between the first slit and the second slit,
    wherein the spacing between the first slit and the second slit is less than a length of the third slit, wherein the plurality of slits cut in the fabric form a repeating pattern across the fabric, wherein each of the plurality of slits includes a first end, a second end, a first side, and a second side, wherein the first side and the second side both extend from the first end to the second end, wherein the plurality of slits provide a substantially closed configuration with the first and second sides of each slit of the plurality of slits being parallel to each other when the fabric is in an unstretched state, and wherein the plurality of slits provide a substantially open configuration with the first and second sides of each slit of the plurality of slits not being parallel to each other when the fabric is in a stretched state in which a stretching force is applied to the fabric, the stretching force having a component that is perpendicular to a long axis of the plurality of slits,
    wherein the second side of the first slit has a first radius of curvature that increases as the second side of the first slit extends away from the first end and the second end of the first slit, the second side of the third slit has a second radius of curvature that decreases as the second side of the third slit extends away from the first end and the second end of the third slit, the first radius of curvature being different than the second radius of curvature; and forming the fabric into at least part of the article of apparel, wherein the fabric is in the unstretched state when formed into at least part of the article of apparel.

18. A method of manufacturing an article of apparel, the method comprising:
providing a fabric having a first surface and an opposite second surface;
cutting a first plurality of slits having a first shape defined by a first radius in the fabric;
cutting a second plurality of slits having a second shape defined by a second radius in the fabric, the first radius being different than the second radius,
wherein the first plurality of slits and the second plurality of slits are cut into the fabric to form at least a first column of linearly spaced slits adjacent to a second column of linearly spaced slits, the first column of linearly spaced slits being staggered from the second column of linearly spaced slits such that a slit in the first column overlies a spacing between two slits in the second column; and
forming the fabric into at least part of the article of apparel,
wherein, when the fabric is an unstretched state, the first plurality of slits are arc shaped and the second plurality of slits are half-moon shaped,
wherein the arc shape has a first radius of curvature that extends along the first radius of the arc shape and decreases near a first end of each of the first plurality of slits,
wherein the half-moon shape has a second radius of curvature that extends along the second radius of the half-moon shape and increases near a second end of each the second plurality of slits, and
wherein the first radius of curvature of the arc shape is different than the second radius of curvature of the half-moon shape.

* * * * *